United States Patent
Parker et al.

(10) Patent No.: US 9,910,336 B2
(45) Date of Patent: Mar. 6, 2018

(54) SPACERS AND CONNECTORS FOR INSULATED GLASS UNITS

(71) Applicant: View, Inc., Milpitas, CA (US)

(72) Inventors: Ronald M. Parker, Olive Branch, MS (US); Yashraj Bhatnagar, Santa Clara, CA (US); Trevor Frank, San Jose, CA (US); Travis D. Wilbur, Capitola, CA (US); Stephen C. Brown, San Mateo, CA (US)

(73) Assignee: View, Inc., Milpitas, CA (US)

( * ) Notice: Subject to any disclaimer, the term of this patent is extended or adjusted under 35 U.S.C. 154(b) by 0 days.

(21) Appl. No.: 15/219,832

(22) Filed: Jul. 26, 2016

(65) Prior Publication Data

US 2016/0334689 A1 Nov. 17, 2016

Related U.S. Application Data

(63) Continuation of application No. 14/196,895, filed on Mar. 4, 2014, now Pat. No. 9,442,339, which is a (Continued)

(51) Int. Cl.
*G02F 1/153* (2006.01)
*G02F 1/15* (2006.01)
(Continued)

(52) U.S. Cl.
CPC ........ *G02F 1/163* (2013.01); *B32B 17/10055* (2013.01); *B32B 17/10174* (2013.01);
(Continued)

(58) Field of Classification Search
USPC .......................... 359/265, 245, 237–239, 275
See application file for complete search history.

(56) References Cited

U.S. PATENT DOCUMENTS

| 4,306,140 A | 12/1981 | Stromquist |
| 4,893,908 A | 1/1990 | Wolf et al. |

(Continued)

FOREIGN PATENT DOCUMENTS

| CH | 525376 A | 7/1972 |
| CN | 1380991 A | 11/2002 |

(Continued)

OTHER PUBLICATIONS

Preliminary Amendment filed Oct. 5, 2015 in U.S. Appl. No. 14/823,969.

(Continued)

*Primary Examiner* — Mohammed Hasan
(74) *Attorney, Agent, or Firm* — Weaver Austin Villeneuve & Sampson LLP; Brian D. Griedel

(57) ABSTRACT

This disclosure describes insulated glass units (IGUs) that incorporate electrochromic devices. More specifically, this disclosure focuses on different configurations available for providing an electrical connection to the interior region of an IGU. In many cases, an IGU includes two panes separated by a spacer. The spacer defines an interior region of the IGU and an exterior region of the IGU. Often, the electrochromic device positioned on the pane does not extend past the spacer, and some electrical connection must be provided to supply power from the exterior of the IGU to the electrochromic device on the interior of the IGU. In some embodiments, the spacer includes one or more holes (e.g, channels, mouse holes, other holes, etc.) through which an electrical connection (e.g., wires, busbar leads, etc.) may pass to provide power to the electrochromic device.

24 Claims, 15 Drawing Sheets

Related U.S. Application Data continuation-in-part of application No. 14/152,873, filed on Jan. 10, 2014, now Pat. No. 9,158,173, which is a continuation of application No. 13/312,057, filed on Dec. 6, 2011, now Pat. No. 8,711,465, said application No. 14/196,895 is a continuation-in-part of application No. 14/103,660, filed on Dec. 11, 2013, now Pat. No. 8,810,889, which is a continuation of application No. 13/326,168, filed on Dec. 14, 2011, now Pat. No. 8,643,933.

(60) Provisional application No. 61/421,154, filed on Dec. 8, 2010, provisional application No. 61/435,914, filed on Jan. 25, 2011.

(51) Int. Cl.
| | |
|---|---|
| *G02F 1/163* | (2006.01) |
| *G02F 1/161* | (2006.01) |
| *B32B 17/10* | (2006.01) |
| *E06B 3/663* | (2006.01) |
| *E06B 9/24* | (2006.01) |
| *G02F 1/155* | (2006.01) |
| *H01R 13/22* | (2006.01) |
| *H01R 13/62* | (2006.01) |

(52) U.S. Cl.
CPC .... *B32B 17/10513* (2013.01); *E06B 3/66304* (2013.01); *E06B 3/66314* (2013.01); *E06B 3/66328* (2013.01); *E06B 3/66333* (2013.01); *E06B 3/66352* (2013.01); *E06B 9/24* (2013.01); *G02F 1/153* (2013.01); *G02F 1/155* (2013.01); *G02F 1/161* (2013.01); *H01R 13/22* (2013.01); *H01R 13/6205* (2013.01); *E06B 2003/6638* (2013.01); *E06B 2003/66385* (2013.01); *E06B 2009/247* (2013.01)

(56) References Cited

U.S. PATENT DOCUMENTS

| | | | |
|---|---|---|---|
| 4,941,302 A | 7/1990 | Barry | |
| 5,170,108 A | 12/1992 | Peterson et al. | |
| 5,313,761 A | 5/1994 | Leopold | |
| 5,379,146 A | 1/1995 | Defendini | |
| 5,384,653 A | 1/1995 | Benson et al. | |
| 5,657,150 A | 8/1997 | Kallman et al. | |
| 5,724,175 A | 3/1998 | Hichwa et al. | |
| 5,877,936 A | 3/1999 | Nishitani et al. | |
| 5,948,195 A | 9/1999 | Thomas | |
| 6,001,487 A | 12/1999 | Ladang et al. | |
| 6,045,896 A | 4/2000 | Boire et al. | |
| 6,055,088 A | 4/2000 | Fix et al. | |
| 6,055,089 A * | 4/2000 | Schulz | G02F 1/163 |
| | | | 136/251 |
| 6,068,720 A | 5/2000 | McHugh | |
| 6,176,715 B1 | 1/2001 | Buescher | |
| 6,204,953 B1 | 3/2001 | Zieba et al. | |
| 6,261,641 B1 | 7/2001 | Zieba et al. | |
| 6,337,758 B1 | 1/2002 | Beteille et al. | |
| 6,369,935 B1 | 4/2002 | Cardinal et al. | |
| 6,407,847 B1 | 6/2002 | Poll et al. | |
| 6,420,071 B1 | 7/2002 | Lee et al. | |
| 6,529,308 B2 | 3/2003 | Beteille et al. | |
| 6,559,411 B2 | 5/2003 | Borgeson et al. | |
| 6,567,708 B1 * | 5/2003 | Bechtel | E06B 9/24 |
| | | | 359/275 |
| 6,795,226 B2 | 9/2004 | Agrawal et al. | |
| 6,897,936 B1 | 5/2005 | Li et al. | |
| 6,919,530 B2 | 7/2005 | Borgeson et al. | |
| 7,002,720 B2 | 2/2006 | Beteille et al. | |
| 7,033,655 B2 | 4/2006 | Beteille et al. | |
| 7,230,748 B2 | 6/2007 | Giron et al. | |
| 7,362,491 B2 | 4/2008 | Busick et al. | |
| 7,531,101 B2 | 5/2009 | Beteille | |
| 7,586,664 B2 | 9/2009 | O'Shaughnessy et al. | |
| 7,710,671 B1 | 5/2010 | Kwak et al. | |
| 7,869,114 B2 | 1/2011 | Valentin et al. | |
| 7,894,119 B2 | 2/2011 | Valentin et al. | |
| 7,929,194 B2 | 4/2011 | Legois et al. | |
| 7,941,982 B2 | 5/2011 | Merica | |
| 8,035,882 B2 | 10/2011 | Fanton et al. | |
| 8,213,074 B1 | 7/2012 | Shrivastava et al. | |
| 8,254,013 B2 * | 8/2012 | Mehtani | G02F 1/163 |
| | | | 345/103 |
| 8,300,298 B2 | 10/2012 | Wang et al. | |
| 8,432,603 B2 | 4/2013 | Wang et al. | |
| 8,643,933 B2 | 2/2014 | Brown et al. | |
| 8,669,503 B2 | 3/2014 | Johnson et al. | |
| 8,711,465 B2 | 4/2014 | Bhatnagar et al. | |
| 8,800,221 B1 | 8/2014 | Header | |
| 8,810,889 B2 | 8/2014 | Brown et al. | |
| 9,019,588 B2 | 4/2015 | Brown et al. | |
| 9,158,173 B2 | 10/2015 | Bhatnagar et al. | |
| 9,360,280 B2 | 6/2016 | White et al. | |
| 9,442,339 B2 | 9/2016 | Parker et al. | |
| 2002/0075552 A1 | 6/2002 | Poll et al. | |
| 2003/0041533 A1 | 3/2003 | Trpkivski | |
| 2003/0227663 A1 | 12/2003 | Agrawal et al. | |
| 2004/0047050 A1 | 3/2004 | Bauer et al. | |
| 2005/0002081 A1 | 1/2005 | Beteille et al. | |
| 2005/0166495 A1 | 8/2005 | Cho et al. | |
| 2006/0077511 A1 | 4/2006 | Poll et al. | |
| 2006/0132923 A1 | 6/2006 | Hsiao et al. | |
| 2006/0187608 A1 | 8/2006 | Stark | |
| 2006/0283084 A1 | 12/2006 | Johnson | |
| 2007/0003726 A1 | 1/2007 | Swannell | |
| 2007/0020442 A1 | 1/2007 | Giron et al. | |
| 2007/0067048 A1 | 3/2007 | Bechtel et al. | |
| 2007/0103761 A1 | 5/2007 | Giron et al. | |
| 2007/0133078 A1 | 6/2007 | Fanton et al. | |
| 2007/0248756 A1 | 10/2007 | Krisko et al. | |
| 2009/0058295 A1 | 3/2009 | Auday et al. | |
| 2009/0067031 A1 | 3/2009 | Piroux et al. | |
| 2009/0097098 A1 | 4/2009 | Piroux | |
| 2009/0110918 A1 | 4/2009 | Jacquiod et al. | |
| 2009/0114928 A1 | 5/2009 | Messere et al. | |
| 2009/0130409 A1 | 5/2009 | Reutler et al. | |
| 2009/0148642 A1 | 6/2009 | Mauser et al. | |
| 2009/0174300 A1 | 7/2009 | Jousse et al. | |
| 2009/0181203 A1 | 7/2009 | Valentin et al. | |
| 2009/0251758 A1 | 10/2009 | Valentin et al. | |
| 2009/0262411 A1 | 10/2009 | Karmhag et al. | |
| 2009/0297806 A1 | 12/2009 | Dawson-Elli et al. | |
| 2009/0323160 A1 | 12/2009 | Egerton et al. | |
| 2009/0323162 A1 | 12/2009 | Fanton et al. | |
| 2010/0208326 A1 | 8/2010 | Kwak et al. | |
| 2010/0243427 A1 | 9/2010 | Kozlowski | |
| 2010/0245973 A1 | 9/2010 | Wang et al. | |
| 2011/0043885 A1 | 2/2011 | Lamine et al. | |
| 2011/0048614 A1 | 3/2011 | Veerasamy et al. | |
| 2011/0051221 A1 | 3/2011 | Veerasamy | |
| 2011/0059275 A1 | 3/2011 | Stark | |
| 2011/0094585 A1 | 4/2011 | Debije et al. | |
| 2011/0148218 A1 | 6/2011 | Rozbicki et al. | |
| 2011/0211247 A1 | 9/2011 | Kozlowski et al. | |
| 2011/0216389 A1 | 9/2011 | Piroux et al. | |
| 2011/0249314 A1 | 10/2011 | Wang et al. | |
| 2011/0260961 A1 | 10/2011 | Burdis | |
| 2011/0266137 A1 | 11/2011 | Wang et al. | |
| 2011/0266138 A1 | 11/2011 | Wang et al. | |
| 2011/0267672 A1 | 11/2011 | Sbar et al. | |
| 2011/0267674 A1 | 11/2011 | Wang et al. | |
| 2011/0267675 A1 | 11/2011 | Wang et al. | |
| 2011/0292488 A1 | 12/2011 | McCarthy et al. | |
| 2011/0299149 A1 | 12/2011 | Park et al. | |
| 2012/0026573 A1 | 2/2012 | Collins et al. | |
| 2012/0033287 A1 | 2/2012 | Friedman et al. | |
| 2012/0062975 A1 | 3/2012 | Mehtani et al. | |
| 2012/0147449 A1 | 6/2012 | Bhatnagar et al. | |
| 2012/0194895 A1 | 8/2012 | Podbelski et al. | |

(56) References Cited

U.S. PATENT DOCUMENTS

| | | |
|---|---|---|
| 2012/0200908 A1 | 8/2012 | Bergh et al. |
| 2012/0239209 A1 | 9/2012 | Brown et al. |
| 2012/0268803 A1 | 10/2012 | Greer et al. |
| 2012/0300280 A1 | 11/2012 | Murphy et al. |
| 2012/0327499 A1 | 12/2012 | Parker et al. |
| 2013/0157493 A1 | 6/2013 | Brown |
| 2013/0241299 A1 | 9/2013 | Snyker et al. |
| 2013/0278988 A1 | 10/2013 | Jack et al. |
| 2013/0319756 A1 | 12/2013 | Snyker et al. |
| 2014/0000191 A1 | 1/2014 | Snyker et al. |
| 2014/0041933 A1 | 2/2014 | Snyker et al. |
| 2014/0160550 A1 | 6/2014 | Brown et al. |
| 2014/0170863 A1 | 6/2014 | Brown |
| 2014/0192393 A1 | 7/2014 | Bhatnagar et al. |
| 2014/0247475 A1 | 9/2014 | Parker et al. |
| 2014/0340731 A1 | 11/2014 | Strong et al. |
| 2014/0349497 A1 | 11/2014 | Brown et al. |
| 2014/0355097 A1 | 12/2014 | Brown et al. |
| 2015/0092260 A1 | 4/2015 | Parker et al. |
| 2015/0118869 A1 | 4/2015 | Brown et al. |
| 2015/0219975 A1 | 8/2015 | Phillips et al. |
| 2015/0346575 A1 | 12/2015 | Bhatnagar et al. |
| 2016/0089869 A1 | 3/2016 | Parker et al. |
| 2016/0363831 A1 | 12/2016 | Ash et al. |

FOREIGN PATENT DOCUMENTS

| | | |
|---|---|---|
| CN | 1734325 A | 2/2006 |
| CN | 1779527 A | 5/2006 |
| CN | 1784631 A | 6/2006 |
| CN | 1822951 A | 8/2006 |
| CN | 1984549 A | 6/2007 |
| CN | 201228500 Y | 4/2009 |
| CN | 202108407 U | 1/2012 |
| DE | 3918913 A1 | 12/1989 |
| DE | 19611245 A1 | 9/1997 |
| DE | 102006042538 | 3/2008 |
| EP | 2136409 | 12/2009 |
| EP | 2348357 | 7/2011 |
| GB | 1437198 | 5/1976 |
| JP | 2000-257352 A | 9/2000 |
| JP | 2001-193364 | 7/2001 |
| TW | 521118 | 2/2003 |
| TW | I253182 | 4/2006 |
| TW | 200731571 A | 8/2007 |
| TW | 201215981 A | 4/2012 |
| WO | WO2002/008826 A1 | 1/2002 |
| WO | WO2003/001290 A1 | 1/2003 |
| WO | WO2005/076061 | 8/2005 |
| WO | WO2006/133298 A2 | 12/2006 |
| WO | WO2006/133298 A3 | 12/2007 |
| WO | WO2008/043951 | 4/2008 |
| WO | WO2009/145876 | 12/2009 |
| WO | WO2009/148861 | 12/2009 |
| WO | WO2011/010067 | 1/2011 |
| WO | WO2011/028253 | 3/2011 |
| WO | WO2011/028254 | 3/2011 |
| WO | WO2011/050291 | 4/2011 |
| WO | WO2011/109688 | 9/2011 |
| WO | WO2012/078634 A2 | 6/2012 |
| WO | WO2012/102964 A1 | 8/2012 |
| WO | WO2012/145155 | 10/2012 |
| WO | WO2013/090264 | 6/2013 |
| WO | WO2013/109881 | 7/2013 |
| WO | WO2014/019780 | 2/2014 |
| WO | WO2014/032023 | 2/2014 |
| WO | WO2014/169253 | 10/2014 |
| WO | WO2015/086459 | 6/2015 |
| WO | WO2016/092278 A1 | 6/2016 |
| WO | WO2016/100075 A1 | 6/2016 |
| WO | WO2016/121331 A1 | 8/2016 |
| WO | WO2016/121332 A1 | 8/2016 |
| WO | WO2016/121347 A1 | 8/2016 |

OTHER PUBLICATIONS

U.S. Appl. No. 14/325,290, filed Jan. 7, 2015.
Preliminary Amendment filed Feb. 23, 2015 in U.S. Appl. No. 14/423,085.
Preliminary Amendment filed Oct. 6, 2015 in U.S. Appl. No. 14/782,772.
Office Action dated Nov. 3, 2014 in U.S. Appl. No. 13/456,056.
Final Office Action dated Jul. 16, 2015 in U.S. Appl. No. 13/456,056.
Office Action dated Feb. 17, 2016 in U.S. Appl. No. 13/456,056.
Office Action dated Oct. 6, 2014 in U.S. Appl. No. 13/968,258.
Final Office Action dated Jun. 5, 2015 in U.S. Appl. No. 13/968,258.
Office Action dated Jul. 11, 2013 in U.S. Appl. No. 13/312,057.
Notice of Allowance dated Dec. 13, 2013 in U.S. Appl. No. 13/312,057.
Office Action dated Jan. 30, 2015 in U.S. Appl. No. 14/152,873.
Notice of Allowance dated May 19, 2015 in U.S. Appl. No. 14/152,873.
Office Action dated May 25, 2016 in U.S. Appl. No. 14/823,969.
Office Action dated Mar. 31, 2015 in U.S. Appl. No. 14/196,895.
Final Office Action dated Sep. 18, 2015 in U.S. Appl. No. 14/196,895.
Notice of Allowance dated Apr. 21, 2016 in U.S. Appl. No. 14/196,895.
Notice of Allowance dated Sep. 18, 2013 for U.S. Appl. No. 13/326,168.
Notice of Allowance dated Jun. 13, 2014 for U.S. Appl. No. 14/103,660, and allowed claims.
Notice of Allowance dated Oct. 9, 2014 for U.S. Appl. No. 14/325,290.
Notice of Allowance dated Feb. 25, 2015 for U.S. Appl. No. 14/325,290.
Office Action dated Feb. 4, 2015 for U.S. Appl. No. 14/591,851.
International Search Report and Written Opinion dated Aug. 12, 2013 for PCT/US2013/037644.
International Preliminary Report on Patentability dated Jun. 11, 2014 for PCT/US2013/037644.
International Search Report and Written Opinion dated Jul. 23, 2012, from PCT/US2011/063534.
International Preliminary Report on Patentability dated Jun. 20, 2013, from PCT/US2011/063534.
International Search Report and Written Opinion dated Apr. 1, 2013 from PCT/US2012/068950.
International Preliminary Report on Patentability dated Jun. 26, 2014 from PCT/US2012/068950.
International Search Report and Written Opinion dated May 18, 2015 from PCT/US2015/014479.
International Search Report and Written Opinion dated Nov. 22, 2013 for PCT/US2013/056506.
International Preliminary Report on Patentability dated Mar. 5, 2015 for PCT/US2013/056506.
International Search Report and Written Opinion dated Aug. 19, 2014 for PCT/US2014/033870.
International Preliminary Report on Patentability dated Oct. 22, 2015 for PCT/US2014/033870.
Partial Supplementary European Search Report dated Dec. 7, 2015 for EP Application No. 13781444.8.
Extended Supplementary European Search Report dated Feb. 16, 2016 for EP Application No. 13781444.8.
EP Office Action dated Nov. 4, 2013 for EP Application No. 11846667.1.
European Search Report dated Mar. 3, 2014 for EP Application No. 11846667.1.
European Search Report dated Apr. 2, 2015 for EP Application No. 12858168.3.
EP Office Action dated May 18, 2016 for EP Application No. 11846667.1.
CN Office Action dated Jun. 2, 2015 in CN Application No. 201180058960.8.
CN Office Action dated Mar. 14, 2016 in CN Application No. 201180058960.8.

(56) References Cited

OTHER PUBLICATIONS

CN Office Action dated Jun. 3, 2015 in CN Application No. 201280069715.1.
TW Office Action dated Oct. 15, 2015 in TW Application No. 100145134.
Ernst, Randi, "Gas Filling of IG Units" by FDR Design, Inc. (undated), 37 pages.
Armstrong, Dave, "Smart, energetic glass could take over" in *Earth Times*, [http://www.earthtimes.org/energy/smart-energetic-glass-take-over/2866/] Apr. 12, 2015.
"'Smart glass' changes colour and produces electricity", ZeeNewsIndia.com [http://zeenews.india.com/news/sci-tech/smart-glass-changes-colour-and-produces-electricity_1577561.html] Apr. 12, 2015.
Preliminary Amendment filed Jun. 17, 2016 in U.S. Appl. No. 14/782,772.
EP Office Action dated Feb. 23, 2017 for EP Application No. 13781444.8.
CN Office Action dated Oct. 8, 2016 for CN Application No. 201380025955.6.
CN Office Action dated Jul. 4, 2017 in CN Application No. 201380025955.6.
RU Office Action dated Sep. 19, 2016 in RU Application No. 2014147152.
RU Search Report dated Jan. 19, 2017 in RU Application No. 2014147152.
TW Office Action dated Oct. 25, 2016 in TW Application No. 102114688.
CN Office Action dated Nov. 16, 2016 in CN Application No. 201180058960.8.
TW Office Action dated Apr. 11, 2017 in TW Application No. 105129376.
Extended Supplementary European Search Report dated Oct. 11, 2016 for EP Application No. 14782906.3.
European Examination Report dated Jun. 9, 2017 for EP Application No. 14782906.3.
International Search Report and Written Opinion dated Apr. 6, 2016 for PCT/US2015/064942.
International Preliminary Report on Patentability dated Jun. 29, 2017 for PCT/US2015/064942.
Burdis et al., "Electrochromic windows: Process and fabrication improvements for lower total costs," SAGE Electronics, Inc., Contract No. DE-FC26-03NT41952, Final Report, Technical Report of SciTech Connect, Mar. 31, 2009.
U.S. Appl. No. 15/535,681, filed Jun. 13, 2017, Strong, et al.
Preliminary Amendment filed Jun. 13, 2017 in U.S. Appl. No. 15/535,681.
Notice of Allowance dated Nov. 24, 2017 in U.S. Appl. No. 13/456,056.
Notice of Allowance dated Dec. 7, 2017 for U.S. Appl. No. 14/823,969.
U.S. Appl. No. 15/868,748, filed Jan. 11, 2015, Parker, et al.

\* cited by examiner

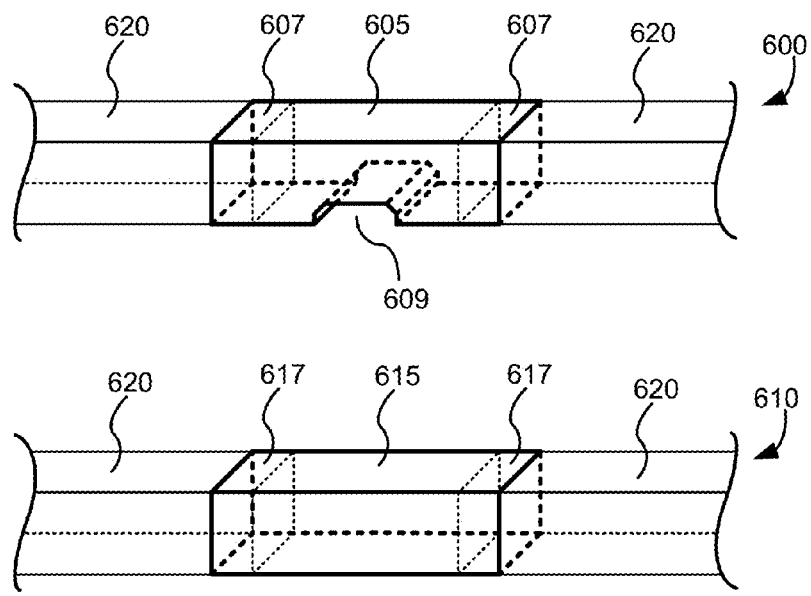
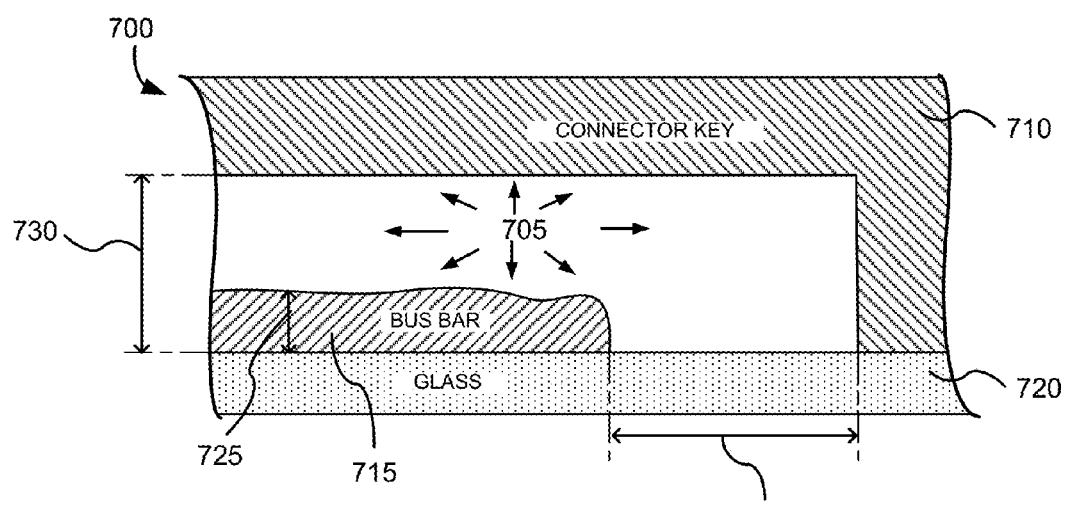

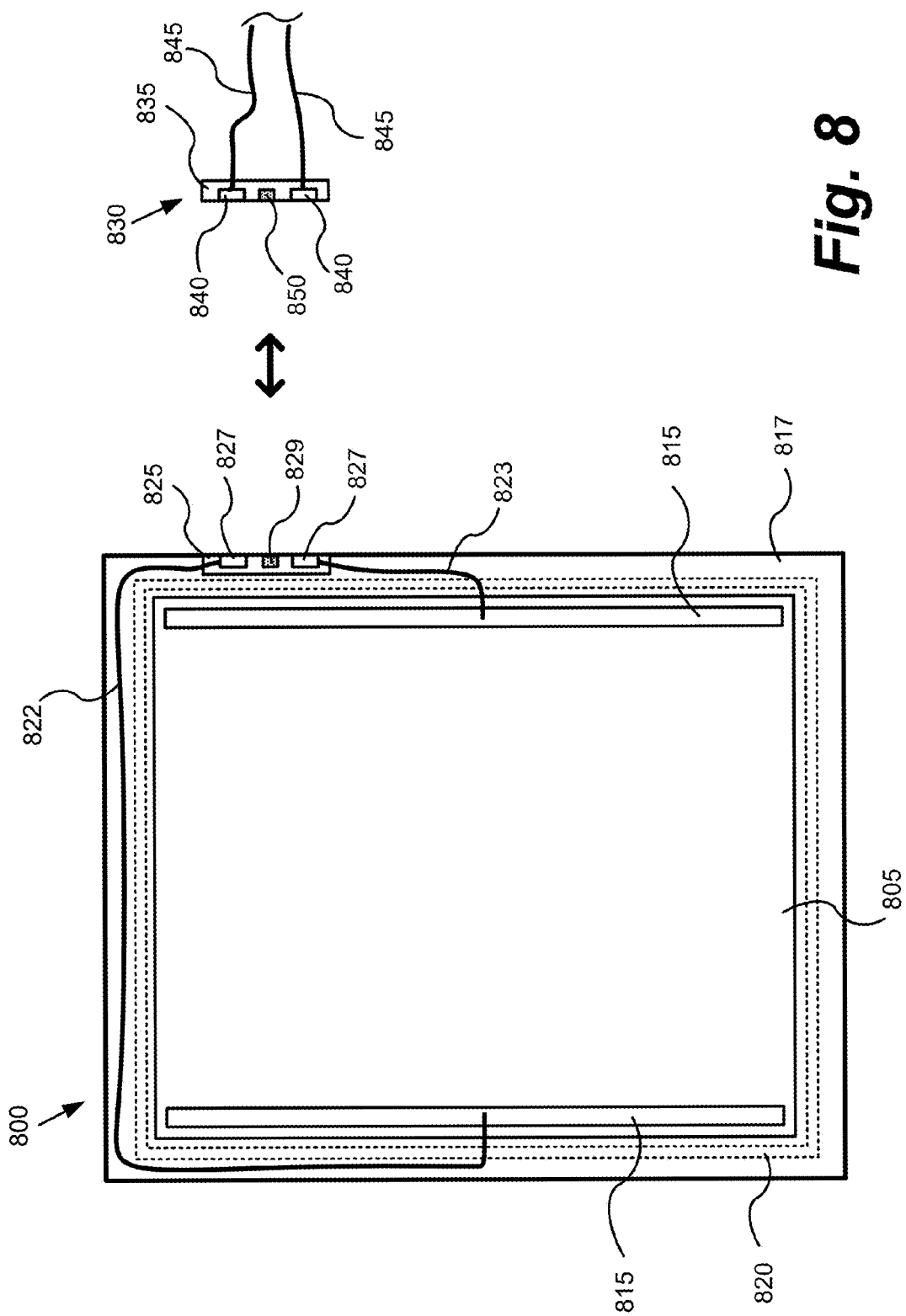

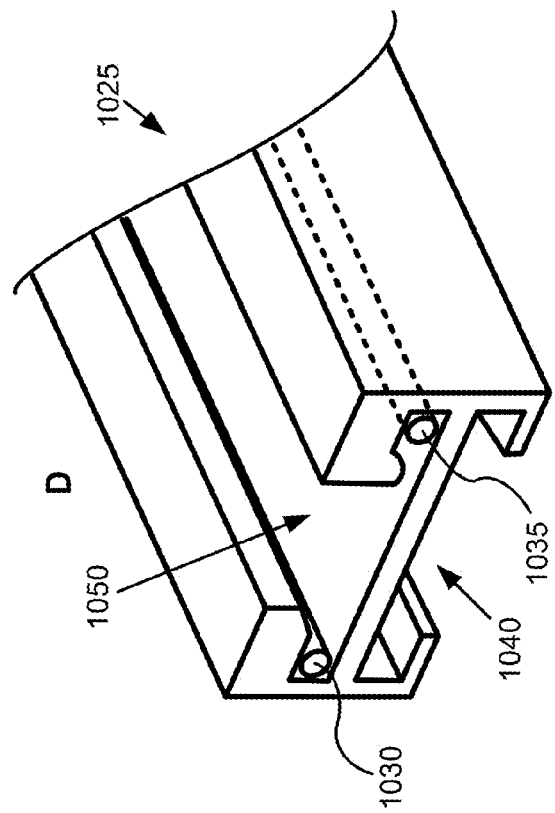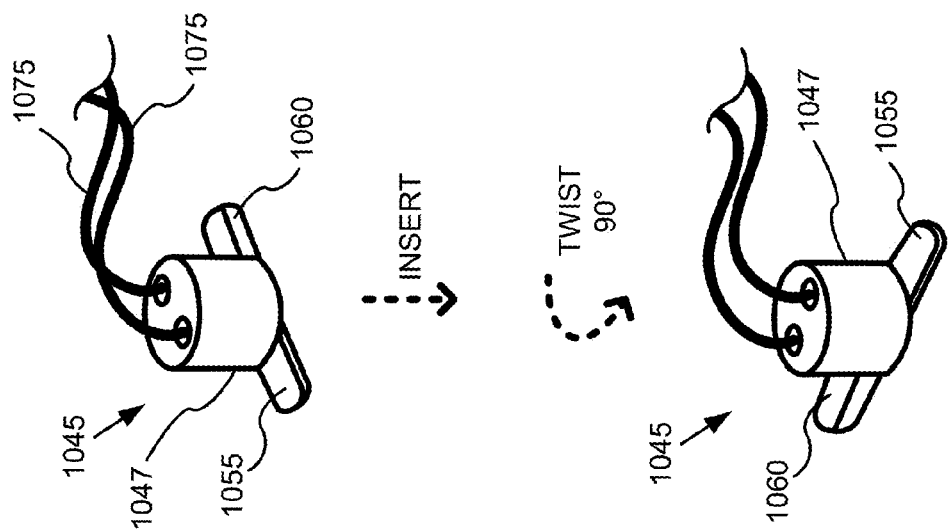
Fig. 10B

SPACERS AND CONNECTORS FOR INSULATED GLASS UNITS

CROSS-REFERENCE TO RELATED APPLICATIONS

This application is a continuation of U.S. application Ser. No. 14/196,895 filed Mar. 4, 2014 Now U.S. Pat. No. 9,442,339 B2, and titled "SPACERS AND CONNECTORS FOR INSULATED GLASS UNITS," which is a continuation-in-part of U.S. patent application Ser. No. 14/152,873 (now U.S. Pat. No. 9,158,173), filed Jan. 10, 2014, and titled "SPACERS FOR INSULATED GLASS UNITS," which is a continuation of U.S. patent application Ser. No. 13/312,057 (now U.S. Pat. No. 8,711,465), filed Dec. 6, 2011, and titled "SPACERS FOR INSULATED GLASS UNITS," which claims benefit of priority to U.S. Provisional Patent Application No. 61/421,154, filed Dec. 8, 2010, and titled "IMPROVED SEPARATORS FOR INSULATED GLASS UNITS," and to U.S. Provisional Patent Application No. 61/435,914, filed Jan. 25, 2011, and titled "IMPROVED SEPARATORS FOR INSULATED GLASS UNITS," each of which is herein incorporated by reference in its entirety and for all purposes. U.S. patent application Ser. No. 14/196,895 is also a continuation-in-part of U.S. patent application Ser. No. 14/103,660 (now U.S. Pat. No. 8,810,889), filed Dec. 11, 2013, and titled "CONNECTORS FOR SMART WINDOWS," which is a continuation of U.S. patent application Ser. No. 13/326,168 (now U.S. Pat. No. 8,643,933), filed Dec. 14, 2011, and titled "CONNECTORS FOR SMART WINDOWS," each of which is herein incorporated by reference in its entirety and for all purposes.

FIELD

The disclosed embodiments relate generally to spacers and insulated glass units containing them, and more particularly to insulated glass units including optically switchable devices.

BACKGROUND

Various optically switchable devices are available for controlling tinting, reflectivity, etc. of window panes. Electrochromic devices are one example of optically switchable devices generally. Electrochromism is a phenomenon in which a material exhibits a reversible electrochemically-mediated change in an optical property when placed in a different electronic state, typically by being subjected to a voltage change. The optical property being manipulated is typically one or more of color, transmittance, absorbance, and reflectance. One well known electrochromic material is tungsten oxide ($WO_3$). Tungsten oxide is a cathodic electrochromic material in which a coloration transition, transparent to blue, occurs by electrochemical reduction.

Electrochromic materials may be incorporated into, for example, windows for home, commercial, and other uses. The color, transmittance, absorbance, and/or reflectance of such windows may be changed by inducing a change in the electrochromic material, that is, electrochromic windows are windows that can be darkened or lightened electronically. A small voltage applied to an electrochromic (EC) device of the window will cause it to darken; reversing the voltage causes it to lighten. This capability allows for control of the amount of light that passes through the window, and presents an enormous opportunity for electrochromic windows to be used not only for aesthetic purposes but also for energy-savings.

With energy conservation being foremost in modern energy policy, it is expected that growth of the EC window industry will be robust in the coming years. An important aspect of EC window engineering is how to integrate EC windows into new and existing (retrofit) applications. Of particular import is how to deliver power to the EC glazings through framing and related structures.

SUMMARY

Insulated glass units (IGUs) incorporating electrochromic devices are disclosed herein. The disclosed IGUs include spacers that allow for an electrical connection to be passed through or under the spacer to provide power from an external power source to the electrochromic device in the IGU.

In one aspect of the disclosed embodiments, an IGU includes a first glass substrate; a second glass substrate oriented parallel to the first glass substrate; an electrochromic device positioned on the first or second glass substrate; two bus bars electrically connected to the electrochromic device; a spacer positioned between the first and second glass substrates proximate the periphery of the first and second glass substrates, where the spacer defines an interior region of the IGU located interior of the spacer and an exterior region of the IGU located outside of the spacer; and one or more wires passing through the spacer to provide electrical power from an external power source located in the exterior region to the bus bars and the electrochromic device in the interior region of the IGU.

In certain embodiments the spacer may be hollow. Where this is the case, the wires may enter the hollow spacer at a first location, pass within the hollow interior of the spacer for a distance, and exit the spacer at a second location. In these or other cases, the spacer may include one or more holes through which the one or more wires pass.

The spacer may include different parts, for example a conductive portion and an insulating or non-conductive portion. For example, the insulating or non-conductive portion may be a connector key that joins the ends of the conductive portion together. In this embodiment, the one or more wires passing through the spacer may traverse the spacer at the insulating or non-conductive connector key. The IGU may also include a controller coupled to the IGU and configured to drive an electrochromic transition of the electrochromic device of the IGU.

In a particular embodiment, the spacer is a track having interior recesses for two or more electrical connections on the interior of the track and exterior recesses for two or more electrical connections on the exterior of the track. The track may include one or more holes through the track for establishing a pass-through electrical connection between the two or more electrical connections on the exterior of the track and the two or more electrical connections on the interior of the track, where the electrical connections on the interior of the track provide power to the bus bars, and where the electrical connections on the exterior of the track provide power from an external power source.

In various implementations, the IGU includes a seal in a hole of the spacer through which the one or more wires pass. The wires passing through the spacer may be provided together as a braided wire. Where the spacer is hollow, a dessicant may be provided in the hollow interior of the spacer.

In another aspect of the disclosed embodiments, an IGU includes a first glass substrate; a second glass substrate oriented parallel to the first glass substrate; an electrochromic device positioned on the first or second glass substrate; two bus bars electrically connected to the electrochromic device; a spacer positioned between the first and second glass substrates proximate the periphery of the first and second glass substrates, where the spacer defines an interior region of the IGU located interior of the spacer and an exterior region of the IGU located outside of the spacer; and one or more electrical connections passing through or under the spacer to provide electrical power from an external power source located in the exterior region to the bus bars and the electrochromic device in the interior region of the IGU.

In certain embodiments, the IGU further includes a channel in or under the spacer, through which the electrical connections pass from the interior region of the IGU to the exterior region of the IGU. For example, the spacer may include an indented portion such that the channel is defined on one side by the first or second glass substrate or a layer of material thereon, and on remaining sides by the indented portion of the spacer as the channel passes from the exterior region to the interior region of the IGU. The channel may have a height between about 0.1-1 mm, in certain cases. The electrical connections may be wires that pass under (or through) the spacer. In other cases, the electrical connections may be bus bar leads that pass under the spacer. A controller may be coupled to the IGU and configured to drive an electrochromic transition of the electrochromic device on the IGU.

These and other features and advantages will be described in further detail below, with reference to the associated drawings.

BRIEF DESCRIPTION OF THE DRAWINGS

FIG. 6 shows two embodiments of connector keys.

FIG. 7 shows an example of a detailed cross-sectional view of a crimped connector key aligned on a glass sheet with an electrochromic device fabricated thereon.

FIGS. 8 and 9 show schematic diagrams of an insulated glass unit including an electrochromic pane and an associated wire assembly.

FIGS. 10A and 10B include schematic diagrams of an insulated glass unit (IGU) with a frame that may serve as both as a secondary sealing element and an electrical connector for an electrochromic pane of the IGU.

DETAILED DESCRIPTION

Figure 1A:
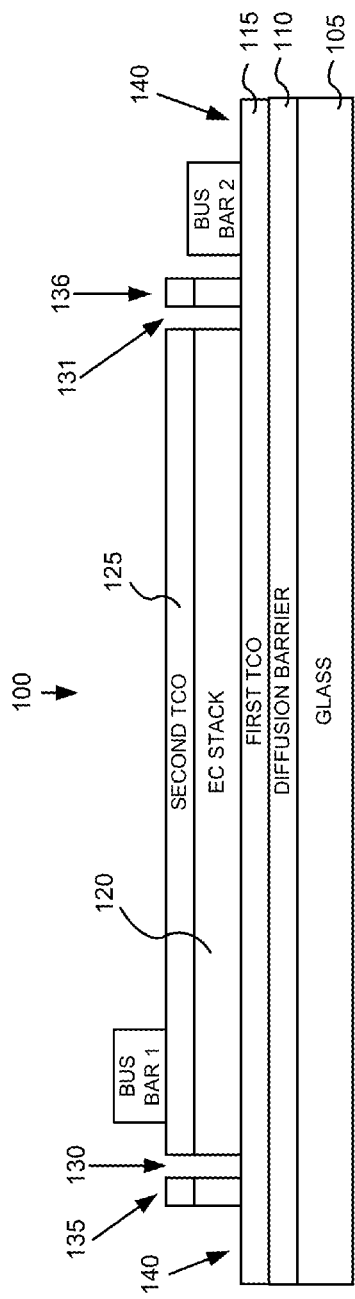
FIGS. 1A-1C show examples of schematic diagrams of electrochromic devices formed on windows.

It should be understood that while the disclosed embodiments focus on electrochromic (EC) windows (also referred to as smart windows), the concepts disclosed herein may apply to other types of switchable optical devices, including liquid crystal devices, suspended particle devices, and the like. For example, a liquid crystal device or a suspended particle device, instead of an electrochromic device, could be incorporated in any of the disclosed embodiments.

An insulated glass unit (IGU) is part of the transparent component of a window. In the following description, an IGU may include two substantially transparent substrates, for example, two glass lites (also referred to as panes), where at least one lite includes an electrochromic device disposed thereon, and the lites have a spacer disposed between them. One or more of the lites may itself be a laminate structure of lites. An IGU is typically hermetically sealed, having an interior region that is isolated from an exterior region including the ambient environment. A window assembly may include an IGU, electrical connectors for coupling the one or more electrochromic devices of the IGU to a window controller, and a frame that supports the IGU and related wiring.

Disclosed herein are various embodiments in which electrochromic windows are incorporated in IGUs with spacers and connectors having improved configurations. An electrochromic window includes a transparent substrate (e.g., a glass sheet or lite) on which is provided a thin electrochromic device. Metal spacers conventionally employed in IGUs may not work well with electrochromic windows due to, e.g., shorting issues with the electrical components of the electrochromic device on one or more lites of the window unit. Specifically, the IGUs disclosed herein generally have measures for avoiding electrical shorting between a metal spacer and conductive components of the electrochromic window, such as bus bars.

For example, electrochromic devices on glass lites use conductive wires, bus bars, or other connections that pass over, under or through a spacer used to form an IGU, for electrical communication to the electrochromic device. Spacers are often chosen, or required, to be a metal, and for some IGUs, the glass lites may be compressed against the spacer. In some configurations, there are problematic issues created by compressing a metallic, conductive spacer against a conductor (e.g., the conductive wires, bus bars, or other connections) of the electrochromic device. Some conventional sealants may not suffice as insulators in such conditions.

In order to orient the reader to the embodiments of IGUs disclosed herein, a brief discussion of electrochromic devices, edge deletion, and IGUs is provided. This initial discussion of electrochromic devices, edge deletion, and IGUs is provided for context only, and the subsequently described embodiments of spacers are not limited to the specific features and fabrication processes of this initial discussion.

Figure 1B:
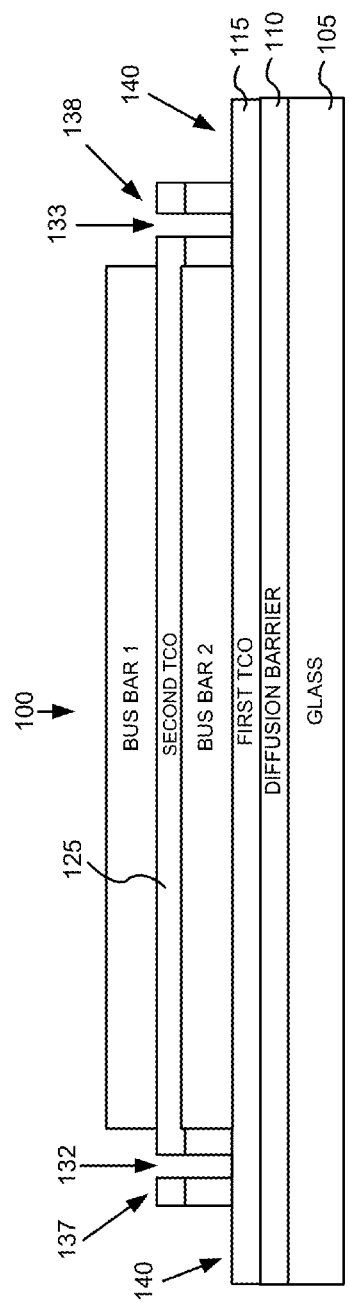
Figure 1C:
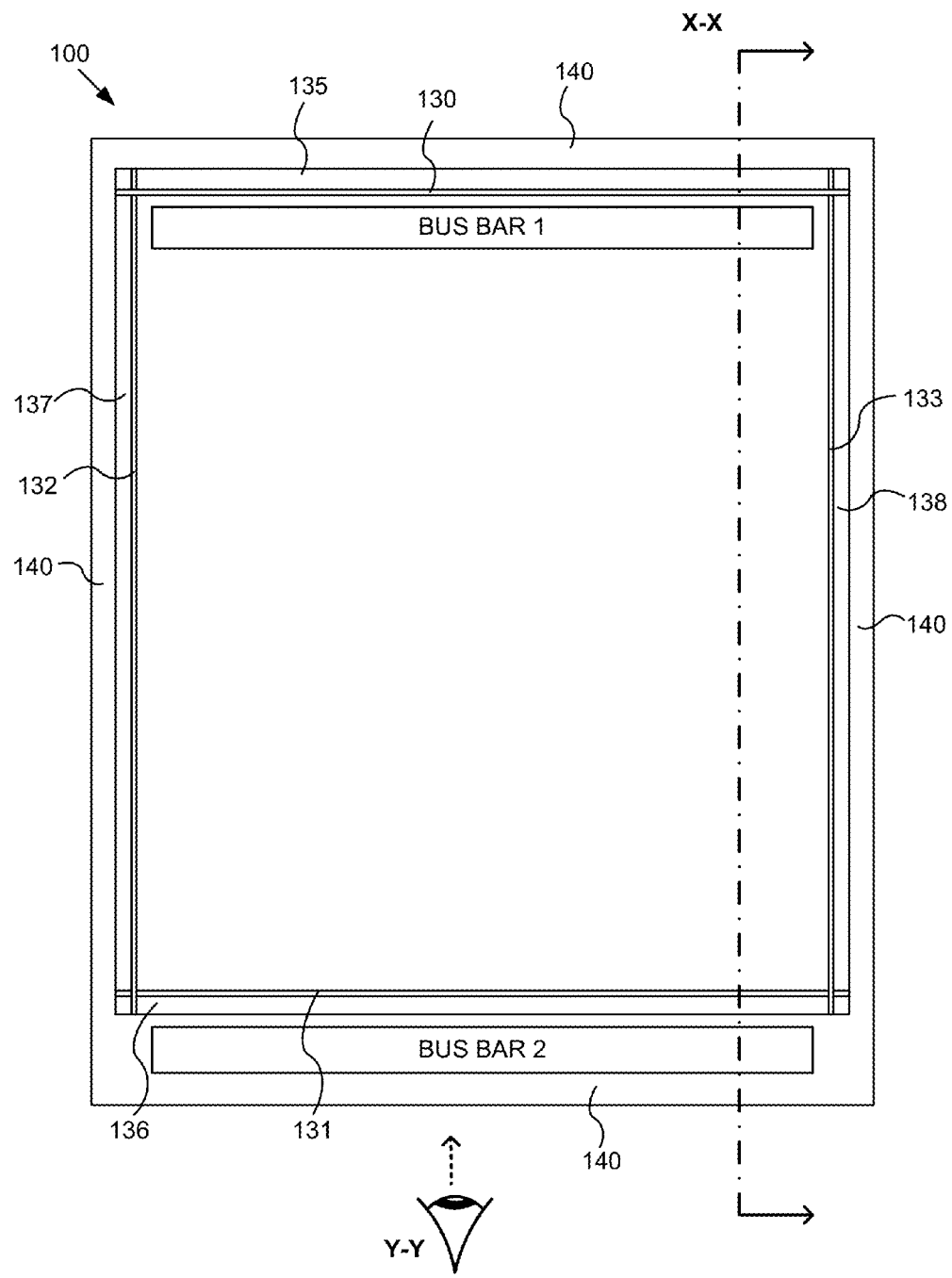

Particular examples of electrochromic devices formed on substrates are described with reference to FIGS. 1A-1C. FIG. 1A is a cross-sectional representation (along cut X-X as depicted in FIG. 1C) of an electrochromic lite, 100, which is fabricated starting with a glass sheet, 105. FIG. 1B shows a different view from Y-Y as depicted in FIG. 1C; i.e., FIG. 1B shows a view of electrochromic lite 100 from the bottom edge and in the plane of the paper (e.g., 90 degrees from the cross-sectional view shown in FIG. 1A). FIG. 1C shows a top-down view of electrochromic lite 100.

FIG. 1A shows an electrochromic lite after edge deletion (described below), laser scribing, and bus bar attachment. Glass sheet 105 has a diffusion barrier, 110, and a first transparent conducting oxide (TCO) layer, 115, on the diffusion barrier. First TCO layer 115 is the first of two conductive layers that form the electrodes of the electrochromic device fabricated on the glass sheet.

In some embodiments, the glass sheet as supplied may include the diffusion barrier layer as well as the first TCO layer. Thus, in some embodiments, an electrochromic stack, 120, and then a second TCO layer, 125, may be formed in the fabrication of electrochromic lite 100. The electrochromic stack (also referred to as an electrochromic device) is typically a series of layers, e.g., an electrochromic layer, an electrolyte layer, and an ion storage layer; however, in some embodiments electrochromic stack 120 is an electrochromic layer and an ion storage layer with an interfacial region that acts as an electrolyte layer. Examples of electrochromic devices including such stacks are described in U.S. patent application Ser. No. 12/772,055, filed Apr. 30, 2010, titled "Electrochromic Devices," and naming Wang et. al as inventors; the application is incorporated by reference in its entirety herein. In some embodiments, electrochromic stack 120 and second TCO layer 125 are fabricated in an integrated deposition system where glass sheet 105 does not leave the integrated deposition system at any time during fabrication of the stack. In some embodiments, first TCO layer 115 is also formed using the integrated deposition system where glass sheet 105 does not leave the integrated deposition system during deposition of the stack/layers. In some embodiments, all of the layers (diffusion barrier 110, first TCO layer 115, electrochromic stack 120, and the second TCO layer 125) are deposited in the integrated deposition system where glass sheet 105 does not leave the integrated deposition system during deposition of the stack/layers.

After formation of the electrochromic device, edge deletion and laser scribing are performed. FIG. 1A depicts areas, 140, where portions of the electrochromic device have been removed from a perimeter region surrounding the laser scribe trenches, 130, 131, 132, and 133 (see also FIGS. 1B and 1C). The laser scribe trenches pass through the second TCO layer and the electrochromic stack, but not through the first TCO. The laser scribe trenches are made to isolate portions of the electrochromic device, 135, 136, 137, and 138, from the operable electrochromic device. The isolated portions of the electrochromic device are portions that were potentially damaged during edge deletion and/or fabrication. If the edge deletion produces a clean cut edge to the device stack, e.g., using lasers for the removal of material in the edge deletion, then these isolation trenches may not be needed.

In some embodiments, laser scribe trenches 130, 132, and 133 pass through the first TCO layer to aide in isolation of the device. Note that laser scribe trench 131 does not pass through the first TCO layer; otherwise, it would cut off bus bar 2's electrical communication with the first TCO layer and thus the electrochromic stack.

The laser or lasers used for the laser scribing are typically, but not necessarily, pulse-type lasers, for example, including diode-pumped solid state lasers. For example, the laser scribing can be performed using a suitable laser from IPG Photonics (Oxford, Mass.), or from Ekspla (Vilnius, Lithuania). Scribing can also be performed mechanically, for example, with a diamond tipped scribe. One of ordinary skill in the art would appreciate that the laser scribing can be performed at different depths and/or performed in a single process whereby the laser cutting depth is varied, or not, during a continuous (or not) path around the perimeter of the electrochromic device. In some embodiments, the edge deletion is performed to the depth below the first TCO layer. In some embodiments, a second laser scribe is performed to isolate a portion of the first TCO layer near the edge of the glass sheet from that toward the interior, as depicted in FIGS. 1A-C, for example. In some embodiments, this scribe is at least along the edge of electrochromic lite 100 where bus bar 2 is applied to the first TCO layer and is between bus bar 2 and the edge of electrochromic lite 100.

After laser scribing is complete, bus bars are attached. In FIGS. 1A-C, a non-penetrating bus bar 1 is applied to second TCO layer 125. Non-penetrating bus bar 2 is applied to an area where the device was not deposited (for example, from a mask protecting first TCO layer 115 from device deposition), in contact with first TCO layer 115 or, as depicted in FIG. 1A, where edge deletion was used to remove material down to first TCO layer 115. In this example, both bus bar 1 and bus bar 2 are non-penetrating bus bars. A penetrating bus bar is one that is typically pressed into and through the electrochromic stack to make contact with the TCO layer at the bottom of the stack. In some embodiments, a soldering step, where a contact is soldered to a bus bar, may serve to penetrate the electrochromic stack and establish electrical contact to a lower conducting layer. A non-penetrating bus bar is one that does not penetrate into the electrochromic stack layers, but rather makes electrical and physical contact on the surface of a conductive layer, for example, a TCO layer. Both types are suitable for use with the embodiments disclosed herein.

Edge deletion may be performed on a window where edge portions of an electrochromic device are removed prior to integration of the window into the IGU. The edge portions may include, for example, regions of "roll off" where layers of an electrochromic stack that are normally separated contact one another due to non-uniformity in the layers near the edge of the electrochromic device.

Further, edge deletion may be employed for removal of one or more electrochromic device layers that would otherwise extend to underneath the IGU. In some embodiments, isolation trenches are cut and the isolated portions of the electrochromic device on the perimeter of the electrochromic lites are removed by edge deletion. The process of performing edge deletion is, in some embodiments, a mechanical process such as a grinding or sandblasting process. An abrasive wheel may be employed for grinding. In some embodiments, edge deletion is done by laser, where a laser is used to ablate electrochromic material from the perimeter of the electrochromic lite. The process may remove all electrochromic device layers, including the underlying TCO layer, or it may remove all electrochromic device layers except the bottom TCO layer. The latter case is appropriate when the edge deletion is used to provide an exposed contact for a bus bar, which may be connected to the bottom TCO layer. In some embodiments, a laser scribe is used to isolate that portion of the bottom TCO layer that extends to the edge of the glass sheet from that which is connected to the bus bar (sometimes referred to as a bus bar pad or contact pad) in order to avoid having a conductive path to the electrochromic device from the edge of the glass sheet.

When edge deletion is employed, it can be performed before or after the electrochromic lites are cut from the glass sheet (assuming that lites are cut from a larger glass sheet as part of the fabrication process). In some embodiments, edge deletion is performed in some edge areas prior to cutting the electrochromic lites and again after they are cut. In some embodiments, all edge deletion is performed prior to cutting the electrochromic lites. In embodiments employing edge deletion prior to cutting the electrochromic lites, portions of the electrochromic device on the glass sheet can be removed in anticipation of where the cuts (and thus edges) of the newly formed electrochromic lites will be. In most fabrication processes, after edge deletion, bus bars are applied to the one or more electrochromic lites.

Figure 3A:
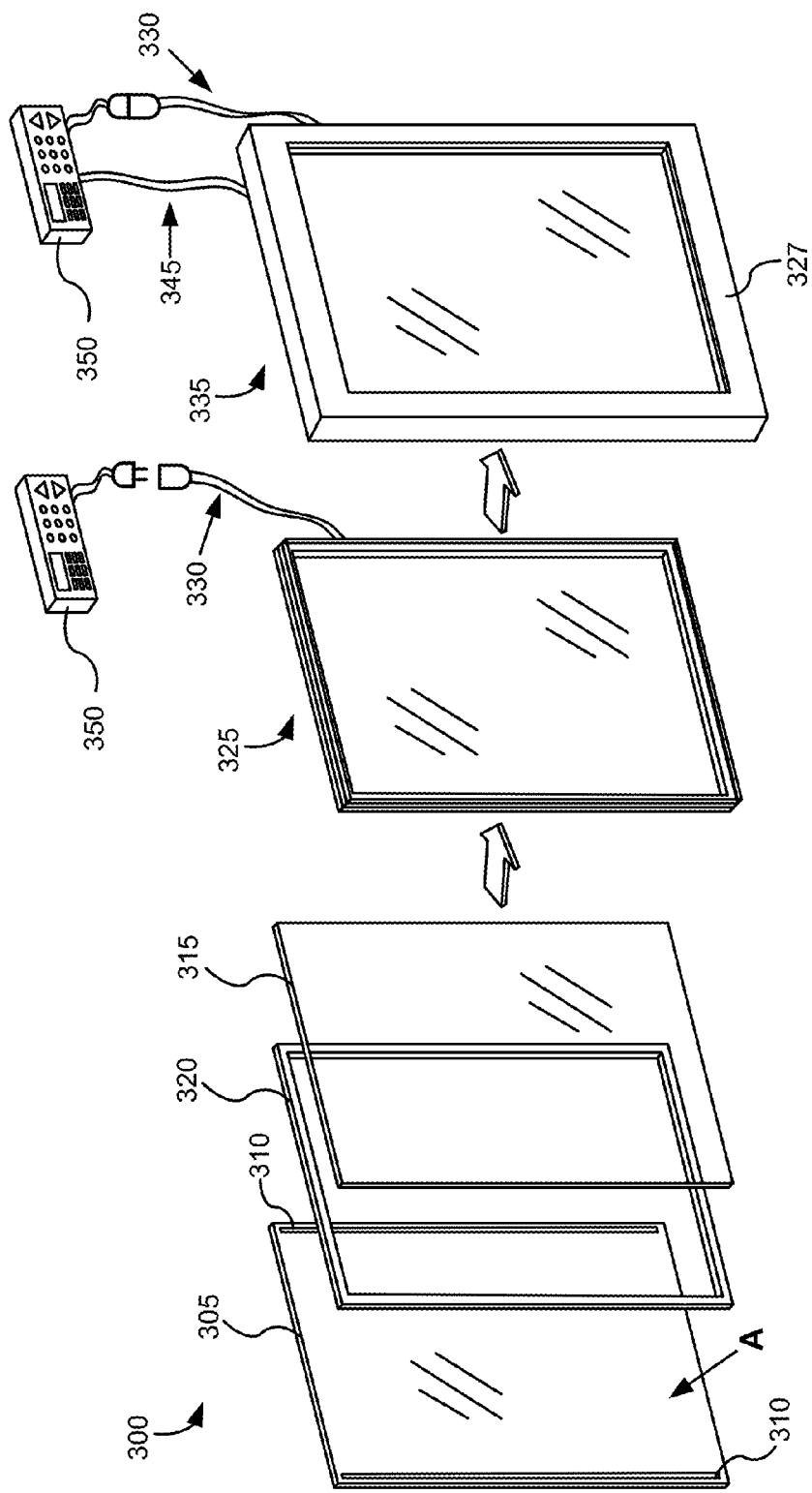
FIG. 3A depicts an example of an electrochromic window fabrication process.

After the electrochromic devices with bus bars are fully assembled on the glass sheets, IGUs are manufactured using the one or more electrochromic lites (e.g., refer to FIG. 3A and the associated description). Typically, an IGU is formed by placing a primary sealing spacer, which may include a gasket or sealing material (e.g., PVB (polyvinyl butyral), PIB (polyisobutylene), or other suitable elastomer) and a rigid spacer around the perimeter of the glass sheet. The primary sealing spacer may also be referred to as a primary sealant. In the disclosed embodiments, the primary sealing spacer includes a metal spacer, or other rigid material spacer, and sealing material between the metal spacer and each glass lite. After the lites are joined to the primary sealing spacer, a secondary seal may be formed around the outer perimeter of the primary sealing spacer. The secondary seal may be, for example, a polymeric material that resists water and that adds structural support to the IGU. Typically, but not necessarily, a desiccant is included in the IGU frame or spacer during assembly to absorb any moisture and/or organic volatiles that may diffuse from the sealant materials. In some embodiments, the primary sealing spacer surrounds the bus bars and electrical leads to the bus bars extend through the seal. Typically, but not necessarily, the IGU is filled with inert gas such as argon. The completed IGU can be installed in, for example, a frame or curtain wall and connected to a source of electricity and a controller to operate the electrochromic window.

Figure 2A:
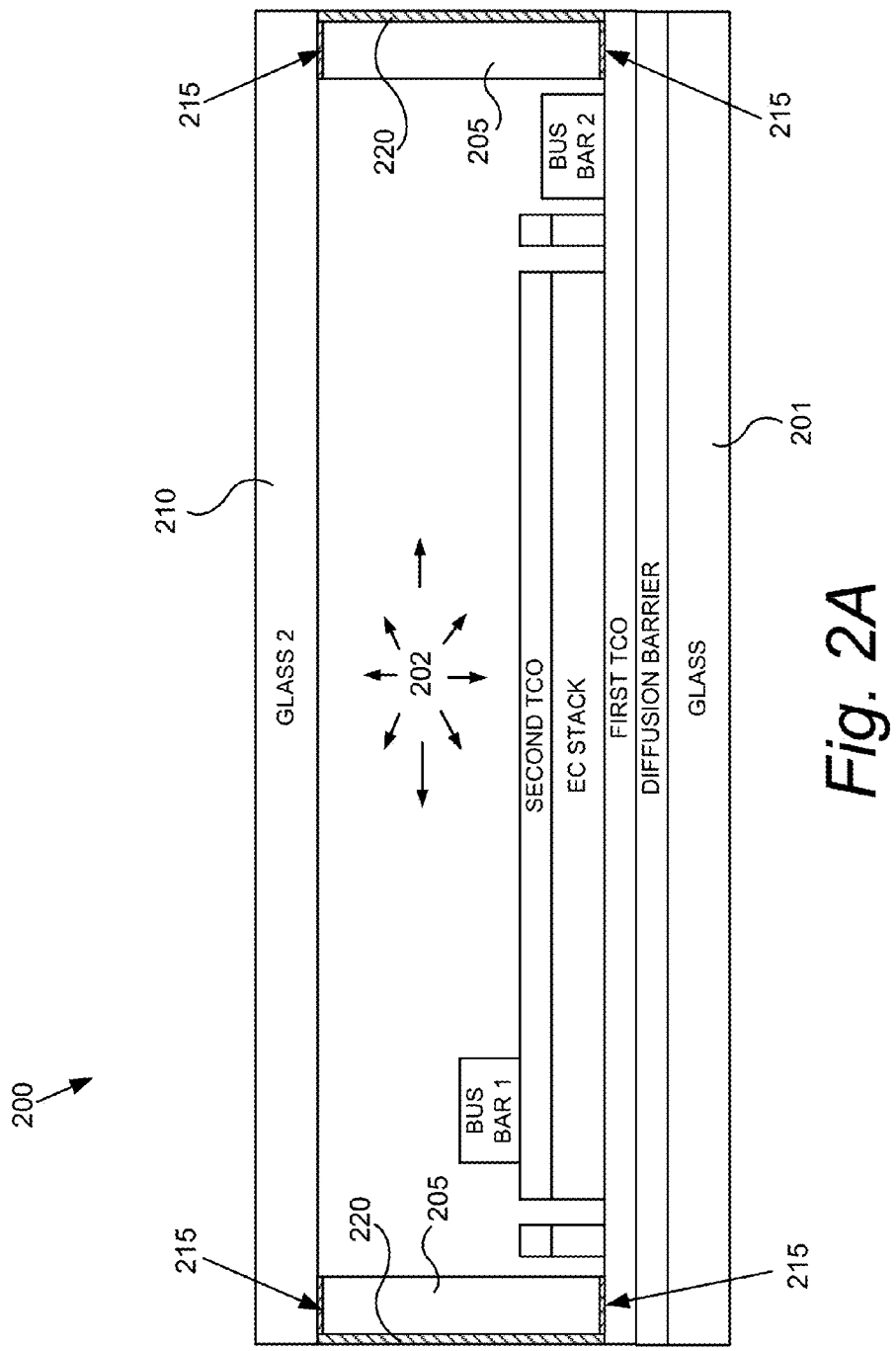
FIG. 2A shows a cross-sectional schematic diagram of an electrochromic window integrated into an IGU.
Figure 2B:
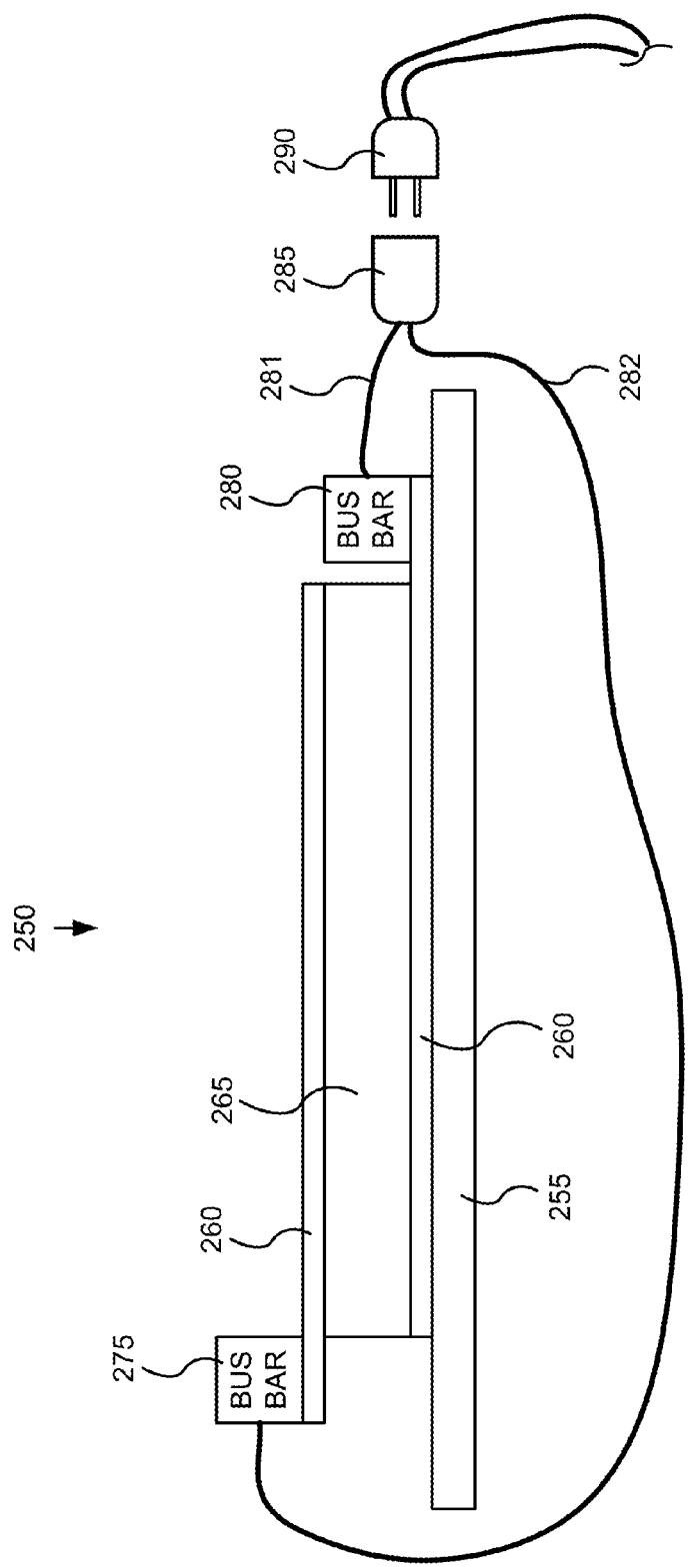
FIG. 2B is an additional cross-sectional schematic of an electrochromic device.

As described above, after the bus bars are connected, the electrochromic lite is integrated into an IGU as shown in FIG. 2A, which includes, for example, wiring for the bus bars and the like (wiring shown in FIG. 2B). In the embodiments described herein, both of the bus bars are inside the primary seal of the finished IGU. FIG. 2A shows a cross-sectional schematic diagram of the electrochromic window as described in relation to FIGS. 1A-C integrated into an IGU, 200. A spacer, 205, is used to separate electrochromic lite 201 from a second lite, 210. Second lite 210 in IGU 200 is a non-electrochromic lite, however, the embodiments disclosed herein are not so limited. For example, lite 210 can have an electrochromic device thereon and/or one or more coatings such as low-E coatings and the like. Lite 201 can also be laminated glass, for example with glass lite 201 laminated to a reinforcing pane via a layer of resin. Between spacer 205 and the first TCO layer of the electrochromic lite is a primary seal material, 215. This primary seal material is also between spacer 205 and second glass lite 210. Around the perimeter of spacer 205 is a secondary seal, 220. Bus bar wiring/leads traverse the seals for connection to controller. Secondary seal 220 may be much thicker than depicted. These seals aid in keeping moisture out of an interior space, 202, of the IGU. They also serve to prevent argon or other gas in the interior of the IGU from escaping.

The electrochromic window may be controlled to provide a desired optical window state. Details regarding voltages and algorithms used for driving an optical state transition for an electrochromic device may be found in U.S. patent application Ser. No. 13/049,623, titled "CONTROLLING TRANSITIONS IN OPTICALLY SWITCHABLE DEVICES," filed Mar. 16, 2011, which is herein incorporated by reference.

Along with voltage algorithms, there is associated wiring and connections for the electrochromic device being powered. FIG. 2B shows an example of a cross-sectional schematic of an electrochromic device, 250. Electrochromic device 250 includes a substrate, 255. The substrate may be transparent and may be made of, for example, glass. A first transparent conducting oxide (TCO) layer, 260, is on substrate 255, with first TCO layer 260 being the first of two conductive layers used to form the electrodes of electrochromic device 250. Electrochromic stack 265 may include (i) an electrochromic (EC) layer, (ii) an ion-conducting (IC) layer, and (iii) a counter electrode (CE) layer to form a stack in which the IC layer separates the EC layer and the CE layer. Electrochromic stack 265 is sandwiched between first TCO layer 260 and a second TCO layer, 270, TCO layer 270 being the second of two conductive layers used to form the electrodes of electrochromic device 250. First TCO layer 260 is in contact with a first bus bar, 280, and second TCO layer 270 is in contact with a second bus bar, 275. Wires, 281 and 282, are connected to bus bars 280 and 275, respectively, and form a wire assembly (not shown) which terminates in a connector, 285. Wires of another connector, 290, may be connected to a controller that is capable of effecting a transition of electrochromic device 250, e.g., from a first optical state to a second optical state. Connectors 285 and 290 may be coupled, such that the controller may drive the optical state transition for electrochromic device 250.

Further details regarding electrochromic devices may be found in U.S. patent application Ser. No. 12/645,111, titled "FABRICATION OF LOW DEFECTIVITY ELECTROCHROMIC DEVICES," filed Dec. 22, 2009. Further details regarding electrochromic devices may also be found in U.S. Pat. No. 8,432,603, filed Dec. 22, 2009, U.S. Pat. No. 8,300,298, filed Apr. 30, 2010, U.S. patent application Ser. No. 12/814,277 filed Jun. 11, 2010, and U.S. patent application Ser. No. 12/814,279 filed Jun. 11, 2010, each titled "ELECTROCHROMIC DEVICES;" each of the aforementioned are herein incorporated by reference.

In accordance with voltage algorithms and associated wiring and connections for powering an electrochromic device, there are also aspects of how the wired EC glazing is incorporated into an IGU and how the IGU is incorporated into, e.g., a frame. FIG. 3A shows examples of the operations for fabricating an insulated glass unit, 325, including an electrochromic pane, 305, and incorporating the insulated glass unit into a frame, 327. Electrochromic pane 305 has an electrochromic device (not shown, but for example on surface A) and bus bars, 310, which provide power to the electrochromic device. Electrochromic pane 305 is matched with another glass pane, 315. The electrochromic pane may include, for example, an electrochromic device similar to the electrochromic device shown in FIGS. 2A and 2B, as described above. In some embodiments, the electrochromic device is solid state and inorganic.

During fabrication of IGU 325, a separator, 320 is sandwiched in between and registered with glass panes 305 and 315. IGU 325 has an associated interior space defined by the faces of the glass panes in contact with separator 320 and the interior surfaces of the separator. Separator 320 may be a sealing separator, that is, the separator may include a spacer and sealing material (primary seal) between the spacer and each glass pane where the glass panes contact the separator.

A sealing separator together with the primary seal may seal, e.g., hermetically, the interior volume enclosed by glass panes 305 and 315 and separator 320 and protect the interior volume from moisture and the like. Once glass panes 305 and 315 are coupled to separator 320, a secondary seal may be applied around the perimeter edges of IGU 325 in order to impart further sealing from the ambient environment, as well as further structural rigidity to IGU 325. The secondary seal may be a silicone based sealant, for example.

IGU 325 may be wired to a window controller, 350, via a wire assembly, 330. Wire assembly 330 includes wires electrically coupled to bus bars 310 and may include other wires for sensors or for other components of IGU 325. Insulated wires in a wire assembly may be braided and have an insulated cover over all of the wires, such that the multiple wires form a single cord or line. A wire assembly may also be referred to as a "pig-tail." IGU 325 may be mounted in frame 327 to create a window assembly, 335. Window assembly 335 is connected, via wire assembly 330, to window controller, 350. Window controller 350 may also be connected to one or more sensors in frame 327 with one or more communication lines, 345. During fabrication of IGU 325, care must be taken, e.g., due to the fact that glass panes may be fragile but also because wire assembly 330 extends beyond the IGU glass panes and may be damaged.

Figure 3B:
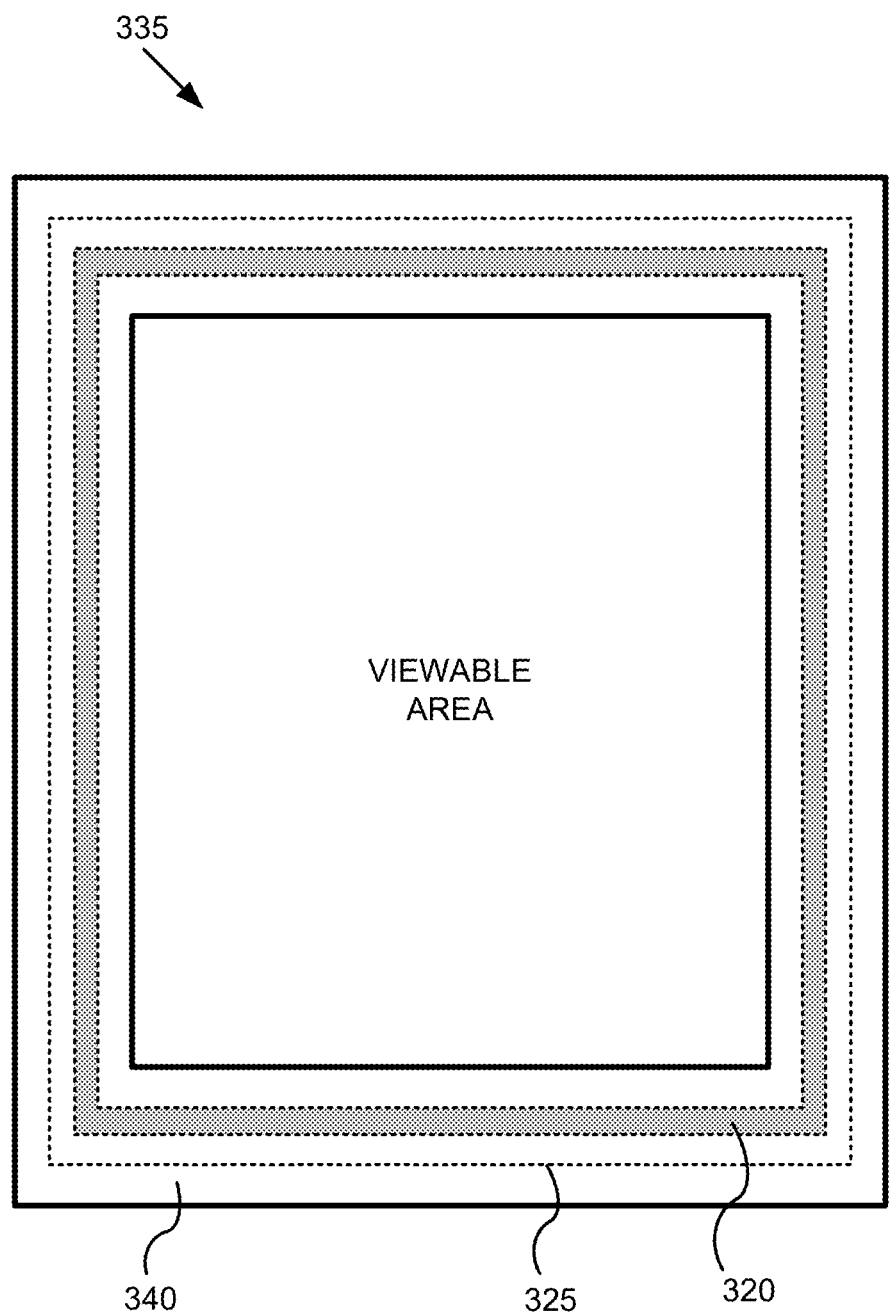
FIG. 3B depicts an example of a window assembly.

FIG. 3B depicts an example of a window assembly, 335, including frame 340. The viewable area of the window assembly is indicated on the figure, inside the perimeter of frame 340 (using a heavy black line). As indicated by dotted lines, inside frame 340 is IGU 325 which includes two glass lites separated by sealing spacer 320, shaded in gray.

In some embodiments, an edge bumper is employed to protect the edges of the glass after incorporation in the IGU. This protection allows the IGU to be safely transported from manufacturer to installation, for example. In some embodiments, the protective bumper is a U-channel cap which fits over the glass edges around the perimeter of the IGU. It may be made from an elastomeric or plastic material. In some embodiments, the edge bumper is a vinyl cap.

Figure 4:
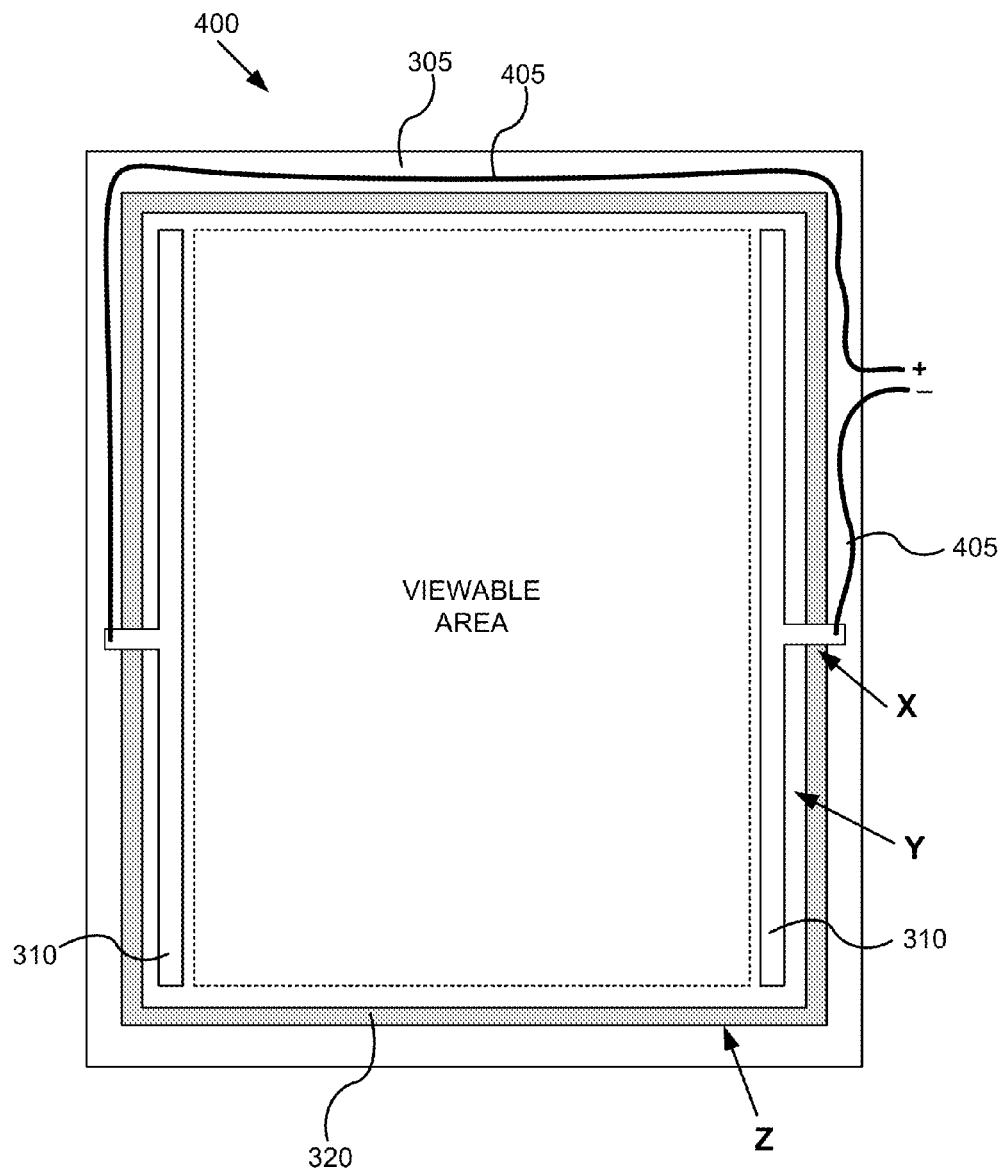
FIG. 4 shows examples of three modes of potential shorting to the spacer and consequent failure of an electrochromic device in an IGU.

FIG. 4 is a facing or front view of an IGU, 400, which includes electrochromic lite 305 as depicted in FIG. 3A. Electrochromic lite 305 has bus bars 310 fabricated on an electrochromic device (not depicted). FIG. 4 shows the relative configurations of the spacer, the electrochromic lite, the wiring, and so forth. Spacer 320 surrounds bus bars 310 and overlays leads to the bus bars. In some embodiments, the bus bar leads may be a conductive ink. Wiring, 405, connects to bus bars 310 via the bus bar leads. Wiring 405 further occupies at least a portion of the secondary seal area and then passes out of IGU 400. In some embodiments, wiring 405 may be insulated (i.e., the wiring may have a conductive metal core covered with an insulating material, for example).

Because the spacer in a conventional IGU is made from a metal, such as a steel hollow bar or a stainless steel hollow bar, for example, it can possibly short out one or more features contained in an electrochromic device employed in an electrochromic window. Using IGU 325 (see FIG. 3A) as an example, lite 315 is pressed together with electrochromic lite 305 with spacer 320 and a primary sealant material there between. With the bus bar leads extending under spacer 320, there is a chance of shorting between the bus bar leads and the spacer.

In some embodiments, rather than bus bar leads traversing the area where the spacer presses against the primary sealant material, wires 405 may traverse the area. However, the compression used to assemble an IGU may compromise the integrity of insulation on wires 405. In some embodiments, wires 405 may be thin, flat wires (e.g., braided wire cabling, ribbon cable, circuit-board type flat electrical connections) with insulation over the wires. In some embodiments, the wires run between the spacer and the lite, rather than leads as depicted in FIG. 4. Even if thin, flat wires are used, there still may be issues with shorting.

FIG. 4 further shows examples of three modes of potential shorting of the electrochromic device to the spacer and consequent failure of the electrochromic device. Reference X illustrates a potential short between the bus bar and the spacer at a "crossover point," e.g., the bus bar lead. The crossover point can be understood as the electrical connection between the bus bar of the electrochromic device and an external connection to the bus bar from outside the interior space of the IGU. Typically, the external connection provides power from a voltage or other power source to the bus bar. The bus bar provides power to one of the two sheet electrodes of the electrochromic device. In the above embodiments, the sheet electrodes are typically transparent conductive oxides (TCOs), such as indium tin oxide (ITO) or TEC (a fluorinated tin oxide conductive layer provided on glass lites marketed under the trademark TEC Glass™ by Pilkington). The contact between the bus bar lead and the spacer shown as reference X is a region where the bus bar lead (or a wire) extends across the spacer from the interior space of the IGU to the secondary seal area. The bus bar lead, which is an extension of the bus bar, is sometimes referred to as a "bus bar exit." Whichever wiring configuration is used, there is a potential for shorting with a conductive spacer. As will be described in more detail below, one mode of addressing this potential problem of an electrical short between the spacer and the bus bar lead is by creating a small notch or "mouse hole" in the underside side of the spacer that contacts the lite in order to allow room for the bus bar lead (or wire) to pass between the lite and the spacer without contacting the spacer.

A second potential short or failure area depicted in FIG. 4 is illustrated by reference Y. In area Y, between the bus bar and the spacer, it is possible that the bus bar itself may contact the conductive spacer. Because the bus bar is a relatively long structure, oriented along one edge of the window, the bus bar could contact a corresponding point on the metal spacer anywhere along the length of the bus bar. Typically the bus bar is situated as close as possible to the spacer without touching it, in order to maximize viewable area of the window. Because of the tight tolerances employed in manufacturing an electrochromic device, it is possible that there will be some minor misalignment of the bus bar and/or the spacer resulting in contact in the area indicated by Y. The bus bar itself typically resides on an inactive area of the electrochromic device, for example, behind a laser scribe line, and the bus bar material used is often light in color. With this also in mind, the bus bar is typically placed very close to the edge of the window at the edge of the electrochromic device. As a consequence, it is typically placed very close to the spacer.

The third mode of potential shorting and failure is illustrated by reference Z. As shown, a contact can occur between the spacer and some amount of the transparent conductive electrode employed in the electrochromic device. While it is typical to remove some or all of the electrochromic device stack, for example, in an edge delete process, it is not uncommon to have some small amount of an underlying conductive film such as ITO or TEC remain near the edge of the device on the window. As described above, the primary sealant, such as PIB or PVB, typically separates the metal spacer bar from the glass lite with the transparent conductive electrode. However, the primary sealant can deform under pressure and it is not uncommon for the sealant to be squeezed out of the seal area over time. As a consequence, there is a significant risk that the spacer will electrically contact some of the transparent conductive electrode and cause a short.

It should be understood that the design placement of the bus bar, the connectors/leads, the location of the conductive electrode layers, etc., are specified with very tight tolerances, e.g., on the order of about a few millimeters or less. It has been found in practice that the specification may not be met. Therefore, each of the three depicted modes of shorting failure represents a significant design challenge. The discussion herein describes certain embodiments that address one or more of these potential modes of failure. One of ordinary skill in the art would appreciate that, where useful, combinations of these embodiments are contemplated as individual embodiments herein. Certain embodiments are described in terms of an IGU; however, one embodiment is a spacer as described herein, or a subassembly of an IGU described herein.

Figure 5A:
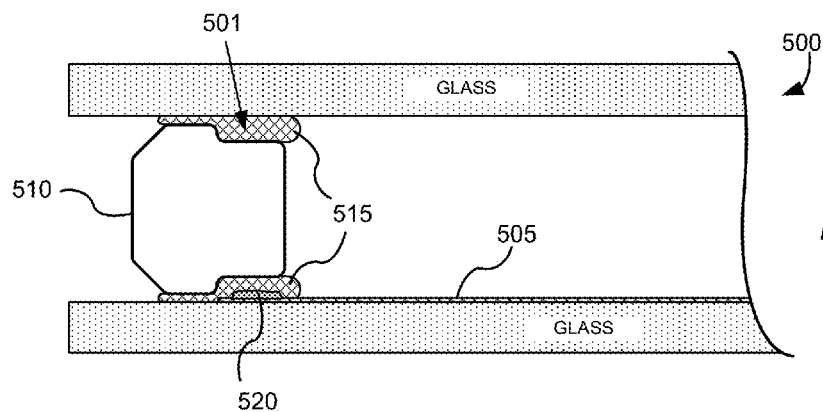
FIG. 5A shows an example of a cross-section of an edge region of an IGU where the spacer of the IGU and the bus bar reside.

FIG. 5A shows an example of a cross section, 500, of an edge region of an IGU where the spacer of the IGU and the bus bar reside. As illustrated, a spacer, 510, is sandwiched between two sheets of glass near the edge of the IGU. In a typical design, the glass interfaces directly with a primary seal material, 515, (e.g., a thin elastomeric layer, such as PIB or PVB), which is in direct contact with spacer 510. In some embodiments, spacer 510 may be metal spacer, such as a steel spacer or a stainless steel spacer, for example. This three-part interface (i.e., glass/primary seal material/spacer) exists on both a top piece of glass and a bottom piece of glass. Spacer 510 may have a hollow structure, as depicted in FIG. 5A. In some embodiments, the spacer may have a substantially rectangular cross section. At a minimum, spacers described herein have at least two surfaces, each substantially parallel to the lites of the IGU in which they are to be incorporated. The remaining cross section, e.g., surfaces of the spacer that face the interior space of the IGU and the exterior, secondary seal area, may have any number of contours, i.e., they need not be flat, but may be. In the example depicted in FIG. 5A, spacer 510 has two surfaces on each face that forms the primary seal, which are substantially parallel to the glass lites of the IGU (a raised surface on the left hand side of the spacer 510 and a depressed surface (notch 501) on the right hand side of the spacer 510). In some embodiments, the top and bottom outer corners of the spacer are beveled and/or rounded to produce a shallower angle in these areas. Rounding, beveling, or smoothing may be included to ensure there are no sharp edges that might enhance electrical shorting. An electrochromic device stack, 505, is fabricated on the lower glass lite, as depicted. A bus bar, 520, is located on electrochromic device stack 505 in order to make electrical contact with one of the electrodes of the device. In this example, bus bar 520 is between spacer 510 and the lower glass lite. This is accomplished by configuring one of the aforementioned surfaces below (see top surface of spacer 510) or above (see bottom surface of spacer 510) the other surface on the face of the spacer that forms the primary seal with the glass surface. This configuration of surfaces forms "notch" 501; see further description below. Primary seal material 515 serves as an insulating layer between bus bar 520 and spacer 510.

There are two primary distinctions between a normal spacer design and spacer 510 shown in FIG. 5A. First, spacer 510 is relatively thicker (wider) in the direction parallel to the glass sheet (i.e., a larger footprint as would be typical from the view depicted in FIG. 3B, for example). A conventional metal spacer is approximately 6 millimeters in width. Spacer 510 is about two times to about two and one half times (about 2× to about 2.5×) that width. For example, spacer 510 may be about 10 millimeters to about 15 millimeters wide, about 13 millimeters to about 17 millimeters wide, or about 11 millimeters wide. This additional width may provide a greater margin of error in a sealing operation compared to a conventional spacer.

The second significant distinction of spacer 510 from a conventional spacer is in the use of recesses or notches 501 on the upper and lower inner corners of spacer 510. In some embodiments, a spacer may include two notches, and in some embodiments, the spacer may include one notch. Two notches, e.g., as depicted in FIG. 5A, may be used for an IGU containing two electrochromic lites, or may be useful in fabricating IGUs with only one electrochromic light. When using a spacer with two notches in an IGU containing one electrochromic lite, there is no need for special placement of a single notch toward the electrochromic lite. In some embodiments, a recess or notch may extend from a corner of one side of the rectangular cross section of the spacer to a point along the one side of the rectangular cross section of the spacer. At least one notch provides an area for covering the bus bar formed on the glass surface and/or covering the bus bar formed on electrochromic device stack 505 formed on the glass surface. In some embodiments, the bus bar is about 2 millimeters to about 3 millimeters in width and about 0.01 millimeters to about 0.1 millimeter in height (thickness). The bus bar length depends on the window size. In some embodiments, a bus bar may have a length about the length of the electrochromic device. The added width, along with the "notched" profile of spacer 510 that accommodates the bus bar, creates a region of "encapsulation" whereby the bus bar is unlikely to contact the spacer at any point along the length of the bus bar, but is encapsulated in the primary sealant.

In some embodiments, the portion of the spacer's face that does not include the notch (i.e., the outer portion of the spacer) is approximately the same width as a normal spacer employed in non-electrochromic IGU applications. As depicted in FIG. 5A, bus bar 520 is entirely covered by the spacer 510. As a consequence, the bus bar is not visible to a user of the window.

In FIG. 5A, electrochromic device stack 505 extends underneath bus bar 520 and partially into the region formed by notch 501 in spacer 510. As noted above, an electrochromic device stack typically includes a conductive electrode layer such as ITO or TEC. Electrochromic device stack 505 may be entirely removed from the edge of the glass surface by an edge deletion process, described above. However, the removal by edge deletion may not extend entirely up to the edge of the bus bar, as this would be unacceptable given normal process tolerances. Therefore, electrochromic device stack 505 may extend just slightly beyond bus bar 520, e.g., while still residing in notch 501.

Spacer 510, which is wider than conventional spacers, as well as notches 501 in spacer 510, provide additional space for primary seal material 515 (e.g., PIB). This feature, along with the notch or notches on the top and/or bottom inside edges of the spacer, give spacer 510 various advantages that are particular to electrochromic devices incorporated in IGUs. For example, a wider primary seal area provides better containment of argon or other gas within the IGU interior as well as protection of the IGU from moisture and other gasses in the ambient environment. The sealing of the IGU secondary seal also may be improved and may provide better structural integrity than a conventional IGU design. Additionally, the IGU may color all the way to the edge defined by the interior perimeter of the spacer. With the bus bars hidden underneath the notch in the spacer, there will be no bright sight lines created either by the inactive area where the bus bar is placed or by the relatively lightly colored material used to fabricate the bus bar.

Figure 5B:
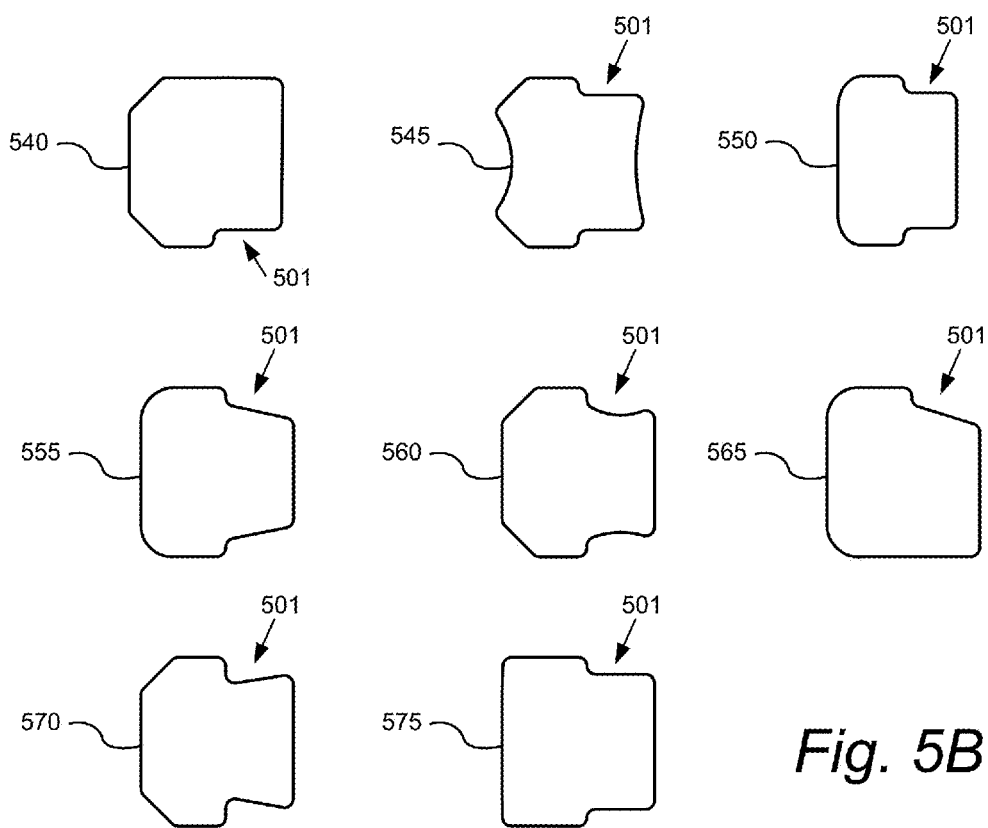
FIG. 5B shows cross-sections of other spacers in accord with embodiments described herein.

Still further, the disclosed embodiment will satisfy industry expectations for an IGU that contains a primary seal having a glass/primary seal material (e.g., PIB)/metal spacer construction. Additionally, because the electrochromic device may employ an edge deletion down to the level of the glass (or the diffusion barrier) and from the glass edge to an area where a notch of the bus bar will form a portion of the primary seal and thus provide more space between the bus bar and spacer, the likelihood of shorting between the electrochromic device electrode and the spacer is greatly reduced. FIG. 5B shows cross-sections of other spacers, 540-575, in accord with embodiments described herein, each spacer having at least one notch 501.

As noted, embodiments described herein, including notched embodiments, may employ a channel or "mouse hole" under an edge of the spacer where a lead or a connector to the bus bar may run to allow connection to an outside power source (described further herein). One embodiment is the spacer as described in relation to FIGS. 5A and 5B including a channel on one or both faces of the spacer that form the primary seal with the lite or lites. As also noted, the bus bar lead is typically oriented substantially perpendicular to the line of the bus bar itself. It is typically made from the same material as the bus bar (e.g., silver, conductive ink, or other highly conductive material). The channel or mouse hole may be formed in a metal spacer, e.g., stainless steel, or be part of a connector key that joins two ends of a slotted, open, spacer. This is described in more detail below.

FIG. 6 shows two embodiments of connector keys. A connector key is typically used to join two ends of a spacer. As noted above, a spacer may be made from hollow metal rectangular pieces. One or more of these pieces are bent into an overall rectangular-shaped piece that forms the spacer. This rectangular-shaped spacer is sized and shaped to mate with the perimeter of the glass used to form an IGU. Two ends of the one or more pieces of tubular spacer material are joined by a connector key. For example, an end of the tubular spacer material may slide over a portion of a connector key, and the other end of the tubular spacer material may slide over another portion of the connector key. Alternatively, as depicted in FIG. 6, the ends of the metal spacer slide into the connector key.

Each of the connector keys in FIG. 6 has been modified to accommodate a bus bar lead. In some embodiments, a metal spacer and a primary seal material form a barrier between an interior region of the window assembly and an exterior region of the window assembly. A lead or a wire passes from an electrode of an optically switchable device on the interior region of the window assembly, under a connector key, and to the exterior region of the window assembly. The connector key is not in electrical communication with the lead or the wire.

In embodiment 600, a connector key, 605, joins two ends, 620, of the spacer. In some embodiments, the spacer may be a metal spacer, such as a steel spacer or a stainless steel spacer, for example. In some embodiments, the spacer may have a substantially rectangular cross section. In some embodiments, the spacer may be hollow. The two ends of the spacer, 607, slide into the respective ends of connector key 605. The connector key and spacer are configured so that when joined, the surfaces that are to come into contact with the glass are substantially co-planar. Connector key 605 has a middle section that is made from a metal, particularly a crimpable metal, such as steel or stainless steel, for example. The bottom portion of the middle region of connector key 605 is made from this crimpable metal and is in fact crimped to produce the channel 609 or mouse hole under which the bus bar lead passes. Of course, connector key 605 could be cast or machined to achieve the same result, but stamped or crimped metal is more economical.

In some embodiments, instead of a bus bar lead passing under channel 609, wiring for an electrode may pass under channel 609. For example, in some embodiments, the wire may be thinner than the thickness (i.e., height) of the channel. In some embodiments, when a thin wire is used, the thickness (i.e., height) of the channel may be reduced.

In embodiment 610, a connector key, 615, joins two ends, 620, of the spacer. The two ends of the spacer, 617, slide into the ends of connector key 615. Connector key 615 is an electrically non-conductive or insulating material (e.g., a plastic). Connector key 615 may or may not have a channel or mouse hole cut into it. Typically, such a channel will be unnecessary because connector key 615 is a non-conductive or insulating material, thereby eliminating the possibility of a short between the connector key and the bus bar lead. Thus, the connector key and the lead will not be in electrical communication.

It should be noted that the connector key normally sits at a random location in the spacer. This is because the tubular metal pieces used to make the spacer typically come in standard or fixed lengths. These lengths may be used to construct a rectangular spacer of effectively arbitrary size, as dictated by the size of the window and the associated IGU. In accordance with the embodiments shown FIG. 6, the spacer may be constructed in a manner in which the connector key lines up with at least one of the bus bar leads. In some embodiments, the spacer is designed so that two separate connector keys are specifically aligned to coincide with the position of the two bus bar leads at opposite sides of the electrochromic device. In some embodiments, one of the connector keys is forced into alignment on the spacer with the bus bar lead. In such embodiments, the opposite bus bar lead may pass through a channel created in the body of the tubular metal used to make the spacer. Such a channel may be created by, e.g., forming a dent or a crimp in the tubular metal piece at a location coinciding with the bus bar lead.

In some other embodiments, the spacer is constructed using conventional connector keys. The spacer may then be dented or crimped at the locations where the bus bar lead passes.

FIG. 7 shows an example of a detailed cross-sectional view of a crimped connector key aligned on a glass sheet with an electrochromic device fabricated thereon. Particularly, the detailed view, 700, shows a channel (mouse hole), 705, in the middle portion of a connector key, 710, where a bus bar lead, 715, on a glass lite, 720, passes through the channel. Various sample dimensions are provided in FIG. 7. It should be understood that these are only examples and that many other dimensions may be appropriate. In some embodiments, bus bar lead 715 may have a height, 725, of about 0.05 millimeters to about 0.1 millimeters. In some embodiments, channel 705 may have a height, 730, of about 0.1 millimeters to about 1 millimeter. In some embodiments, channel 705 may have a width in connector key 710 of about 4.5 millimeters to about 10 millimeters. In some embodiments, a clearance, 735, that may be desired on either side of bus bar 715 may be between about 1.5 and about 2.5 millimeters.

A crimping process that may be used to form a crimped metal connector key may have tolerances associated with the process. Therefore, the channel formed in a connector key may be specified to be somewhat larger than what is desired to account for the tolerances in the process.

In some embodiments, the channel for the bus bar lead is located as in the embodiment described with respect to FIGS. 6 and 7, but need only penetrate part way under the spacer because the bus bar resides midway underneath the spacer. In some embodiments, the bus bar lead channel resides on an outside edge of the spacer or on an outside edge of a corner of the spacer.

FIG. 8 is a schematic diagram of an insulated glass unit, 800, including an electrochromic pane, 805, and an associated wire assembly, 830. IGU 800 includes electrochromic pane 805 which includes bus bars, 815, which are in electrical communication with an EC device, 817 (for an exemplary cross-section see FIG. 2A). Electrochromic pane 805 is matched with another pane (not shown) and attached to the other pane with a separator, 820 (indicated by the dotted lines). The area of EC pane 805 outside of separator 820 is a secondary sealing area, while EC device lies within the perimeter of separator 820 (which forms the primary seal against the glass panes of the IGU). In the assembled IGU, the secondary sealing area is typically filled with a sealing compound to form a secondary seal. Wires, 822 and 823, are connected to bus bars 815 and extend through IGU 800 from bus bars 815, through or under spacer 820, and within the secondary seal to a first connector, 825. Wires 822 and 823 may be positioned such that they do not appear in the viewable region of the panes. For example, the wires may be enclosed in the sealing separator or the secondary seal as depicted. In some embodiments, and as depicted, first connector 825 may be housed substantially within the secondary seal. For example, first connector 825 may be surrounded by the secondary sealant on all sides except for the face of first connector 825 having two pads, 827. The first connector may be housed substantially within the secondary seal in different manners. For example, in some embodiments, the first connector may be housed substantially within the secondary seal and be recessed relative to the edges of the glass panes. In some embodiments, the first connector may be housed substantially within the secondary seal and protrude beyond the edges of the glass panes. In other embodiments, first connector 825 may itself form part of the secondary seal, e.g., by sandwiching between the glass panes with sealant disposed between itself and the glass panes.

As noted above, first connector 825 includes two pads 827. The two pads are exposed and provide electrical contact to wires 822 and 823. In this example, first connector 825 further includes a ferromagnetic element, 829. Wire assembly 830 includes a second connector, 835, configured to mate with and provide electrical communication with pads 827. Second connector 835 includes a surface having two pads, 840, that provide electrical contact to wires, 845, of the wire assembly. Second connector 835 further includes a ferromagnetic element, 850, configured to register and mate with ferromagnetic element 829 of the first connector.

Pads 840 of second connector 835 are configured or shaped for mechanical and electrical contact with pads 827 of first connector 825. Further, at least one of ferromagnetic elements 829 or 850 of first connector 825 or second connector 835, respectively, may be magnetized. With at least one of ferromagnetic elements 829 or 850 being magnetized, first connector 825 and second connector 835 may magnetically engage one another and provide electrical communication between their respective pads. When both ferromagnetic elements are magnetized, their polarity is opposite so as not to repel each other when registered. A distal end (not shown) of the wire assembly 830 may include terminals, sometimes provided in a plug or socket, that allow the wire assembly to be connected to a window controller. In one embodiment, a distal end of wire assembly 830 includes a floating connector.

In one embodiment, rather than a pad to pad contact (e.g., 827 to 840 as in FIG. 8) for the first and second connectors, a pad to spring-type pin configuration is used. That is, one connector has a pad electrical connection and the other connector has a corresponding spring-type pin, or "pogo pin"; the spring-type pin engages with the pad of the other connector in order to make the electrical connection. In one embodiment, where ferromagnetic elements are also included, the magnetic attraction between the ferromagnetic elements of the first and second connectors is sufficiently strong so as to at least partially compress the spring mechanism of the pogo pin so as to make a good electrical connection when engaged. In one embodiment, the pads and corresponding pogo pins are themselves the ferromagnetic elements.

In some embodiments, first connector 825, second connector 835, or the terminals or connector at the distal end of the wire assembly (e.g. a floating connector) may include a memory device and/or an integrated circuit device. The memory device and/or integrated circuit device may store information for identifying and/or controlling electrochromic pane 805 in IGU 800. For example, the device may contain a voltage and current algorithm or voltage and current operating instructions for transitioning electrochromic pane 805 from a colored stated to a bleached state or vice versa. The algorithm or operating instructions may be specified for the size, shape, and thickness of electrochromic pane 805, for example. As another example, the device may contain information that identifies the shape or size of electrochromic pane 805 to a window controller such that electrochromic pane 805 may operate in an effective manner. As yet another example, the device may contain information specifying a maximum electric signal and a minimum electric signal that may be applied to electrochromic pane 805 by a window controller. Specifying maximum and minimum electric signals that may be applied to the electrochromic pane may help in preventing damage to the electrochromic pane.

In another example, the memory and/or integrated circuit device may contain cycling data for the EC device to which it is connected. In certain embodiments, the memory and/or integrated circuit device includes part of the control circuitry for the one or more EC devices of the IGU. In one embodiment, individually, the memory and/or integrated circuit device may contain information and/or logic to allow identification of the EC device architecture, glazing size, etc., as described above, e.g., during a testing or initial programming phase when in communication with a controller and/or programming device. In one embodiment, collectively, the memory and/or integrated circuit device may include at least part of the controller function of the IGU for an external device intended as a control interface of the installed IGU.

Further, in embodiments in which first connector 825 includes the memory device and/or the integrated circuit device, damage to the electrochromic pane may be prevented because the device is part of IGU 800. Having the maximum and minimum electric signals that may be applied to electrochromic pane 805 stored on a device included in first connector 825 means that this information will always be associated with IGU 800. In one example, a wiring assembly as described herein includes five wires and associated contacts; two of the wires are for delivering power to the electrodes of an EC device, and the remaining three wires are for data communication to the memory and/or integrated circuit device.

Wire assembly 830 described with respect to FIG. 8 may be easily attachable to, and detachable from, IGU 800. Wire assembly 830 also may aid in the fabrication and handling of an IGU because wire assembly 830 is not permanently attached to the IGU and will therefore not interfere with any fabrication processes. This may lower the manufacturing costs for an IGU. Further, as noted above, in some IGUs that include wire assemblies that are permanently attached to the IGU, if the wire assembly becomes damaged and/or separated from the IGU, the IGU may need to be disassembled to reconnect the wire assembly or the IGU may need to be replaced. With a detachable wire assembly, an IGU may be installed and then the wire assembly attached, possibly precluding any damage to the wire assembly. If a wire assembly is damaged, it can also be easily replaced because it is modular.

Additionally, the detachable wire assembly allows for the replacement or the upgrade of the wire assembly during the installed life of the associated IGU. For example, if the wire assembly includes a memory chip and/or a controller chip that becomes obsolete or otherwise needs replacing, a new version of the assembly with a new chip can be installed without interfering with the physical structure of the IGU to which it is to be associated. Further, different buildings may employ different controllers and/or connectors that each require their own special wire assembly connector (each of which, for example, may have a distinct mechanical connector design, electrical requirements, logic characteristics, etc.). Additionally, if a wire assembly wears out or becomes damaged during the installed life of the IGU, the wire assembly can be replaced without replacing the entire IGU.

In certain embodiments, each of the first and second connectors includes at least two ferromagnetic elements. In a specific embodiment, each of the first and second connectors includes two ferromagnetic elements. A "double" magnetic contact allows for more secure connections. Magnets such as neodymium based magnets, e.g., comprising $Nd_2Fe_{14}B$, are well suited for this purpose because of their relatively strong magnetic fields as compared to their size. As described above, the two ferromagnetic elements may be part of the electrical pads, or not. In one embodiment, the two ferromagnetic elements in each of the first and the second connectors are themselves magnets, where the poles of the magnets of each of the first and second connectors that are proximate when the connectors are registered, are opposite so that the respective magnets in each of the first and second connectors attract each other.

When installing an IGU in some framing systems, e.g., a window unit or curtain wall where multiple IGUs are to be installed in proximity, it is useful to have flexibility in where the electrical connection is made to each IGU. This is especially true since typically the EC glazing of the IGUs is always placed on the outside of the installation, facing the external environment of the installation. Given this configuration, having the connectors in the same position within the secondary seal of the IGUs of the installation requires much more wiring to the controller. However, for example, if the electrical connectors in the IGUs (as described herein) can be positioned more proximate to each other, then less wiring is needed from the IGU to the framing system in which the IGUs are installed. Thus, in some embodiments, IGU 800 may include more than one first connector 825, that is, redundant connectors are installed. For example, an IGU 800 might include not only a first connector 825 at the upper right hand side, but also another connector at the lower left hand side or at the lower right hand side or the upper left hand side or in the top or bottom portion of the IGU. In this example, the connectors are all within the secondary seal. The exact position on each edge is not critical; the key is having more than one connector that feeds the same EC device so that when installing the IGU, there is flexibility in where to attach the external connector to the IGU. When an IGU having multiple connectors is mounted in a frame holding 2, 4, 6, or more similar IGUs, for example, having multiple first connectors included within each IGU, allows for more convenient routing of the wires (e.g., wires 845 as in FIG. 8 associated with each wire assembly 830) in the frame due to the flexibility of having multiple redundant first connectors to which the second connector may be coupled. In one embodiment, the IGU has two first connectors, in another embodiment three first connectors, in yet another embodiment four first connectors. In certain embodiments there may be five or six first connectors. Although the number of connectors may impact production costs, this factor may be more than compensated for by the higher degree of flexibility in installation, e.g., in an expensive and sophisticated curtain wall installation where volume to accommodate wiring is often limited and installing multiple first connectors during fabrication is relatively easy.

In some embodiments, the IGU 800, may include two electrochromic panes. In these embodiments, the first connector may include four pads (or corresponding pad to pin contacts) to provide contacts to the bus bars of each of the electrochromic panes (i.e., each electrochromic pane would include at least two bus bars). Additional pads for control and communication with the electrochromic device and/or onboard controller may also be included, e.g., four pads for bus bar wiring and three additional pads for communication purposes. Likewise, second connector 835 would include four pads to provide electrical contact to wires of the wire assembly. In other embodiments, each EC pane may have its own first connector, or two or more redundant first connectors. Further description of an IGU that includes two or more electrochromic panes is given in U.S. Pat. No. 8,270,059, titled "MULTI-PANE ELECTROCHROMIC WINDOWS," filed Aug. 5, 2010, which is herein incorporated by reference.

Figure 9:
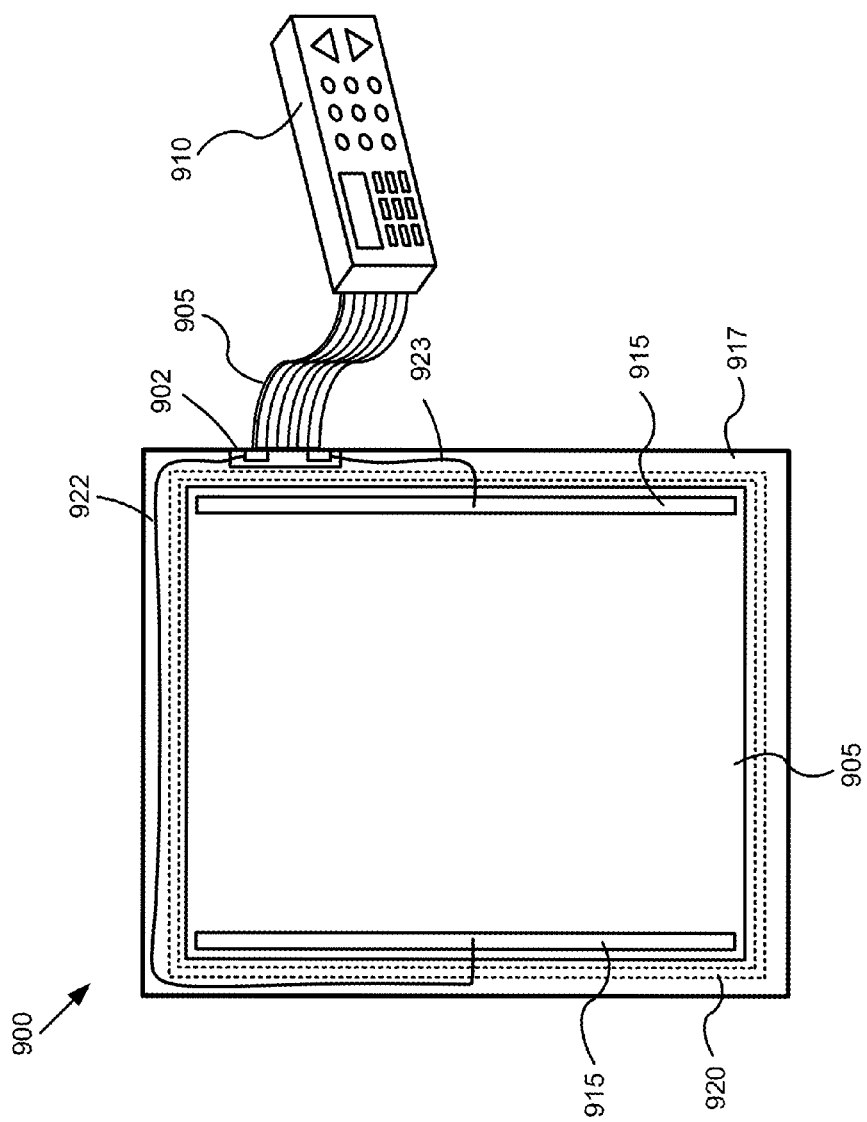

FIG. 9 shows a schematic diagram of an insulated glass unit including an electrochromic pane and an associated ribbon cable. The IGU 900 includes an electrochromic pane, 905, having bus bars, 915, which are in electrical communication with an EC device, 917 (for an exemplary cross-section see FIG. 2A). Electrochromic pane 905 is matched with another pane (not shown) and attached to the other pane with a separator, 920 (indicated by the dotted lines). Outside of separator 920 is a secondary sealing area. Wires 922 and 923 are connected to bus bars 915 and extend through IGU 900 to a connector, 902. Connector 902 is capable of being connected to a ribbon cable, 905. Ribbon cable 905 may be connected to a window controller, 910. In some embodiments, the ribbon cable may be a cable with many conducting wires running parallel to each other on the same plane.

The ends of the ribbon cable may include connectors for connecting to connector 902 and to window controller 910.

In some embodiments, connector 902 may be similar to connector 825 of FIG. 8 (i.e., connector 902 may include one or more ferromagnetic elements) and ribbon cable 905 also may include one or more ferromagnetic elements for engaging connector 902 with ribbon cable 905. Other mechanisms also may be used to engage connector 902 with ribbon cable 905.

In some embodiments, connector 902 may include a memory device and/or an integrated circuit device. Ribbon cable 905 may include more wires or electrically conductive paths than the two paths needed to electrically connect to bus bars 915 of electrochromic pane 905 so that the window controller can communicate with the memory device and/or the integrated circuit device. In some embodiments, the ribbon cable may have electrically conductive paths for controlling more than one electrochromic pane, as described below. Ribbon cables have advantages including the capability of having multiple parallel wires for carrying power, communication signals etc., in a thin, flexible format.

In some embodiments, IGU 900 includes two or more electrochromic panes. Connector 902 may be capable of providing electrical contact to the bus bars of each of the electrochromic panes (i.e., each electrochromic pane would include at least two bus bars). Thus, in the example of an IGU having two electrochromic panes, the ribbon cable may include four conducting wires running parallel to each other on the same plane for powering the electrochromic panes.

As described above, where a connector is configured within an IGU may be important when considering where to attach wiring connectors to the IGU. Flexibility in attaching wiring assemblies to an IGU can significantly reduce wiring complexity and length, and thus save considerable time and money, both for fabricators and installers. One embodiment is an electrical connection system including a track, the track including two or more rails that provide electrical communication, via wiring and bus bars, to the electrodes of an EC device of the IGU. The track is, e.g., embedded in the secondary sealing area of the IGU. An associated connector engages the rails and thereby makes electrical connection to the rails. A non-limiting example of the track described above is described in relation to FIGS. 10A and 10B.

Figure 10A:
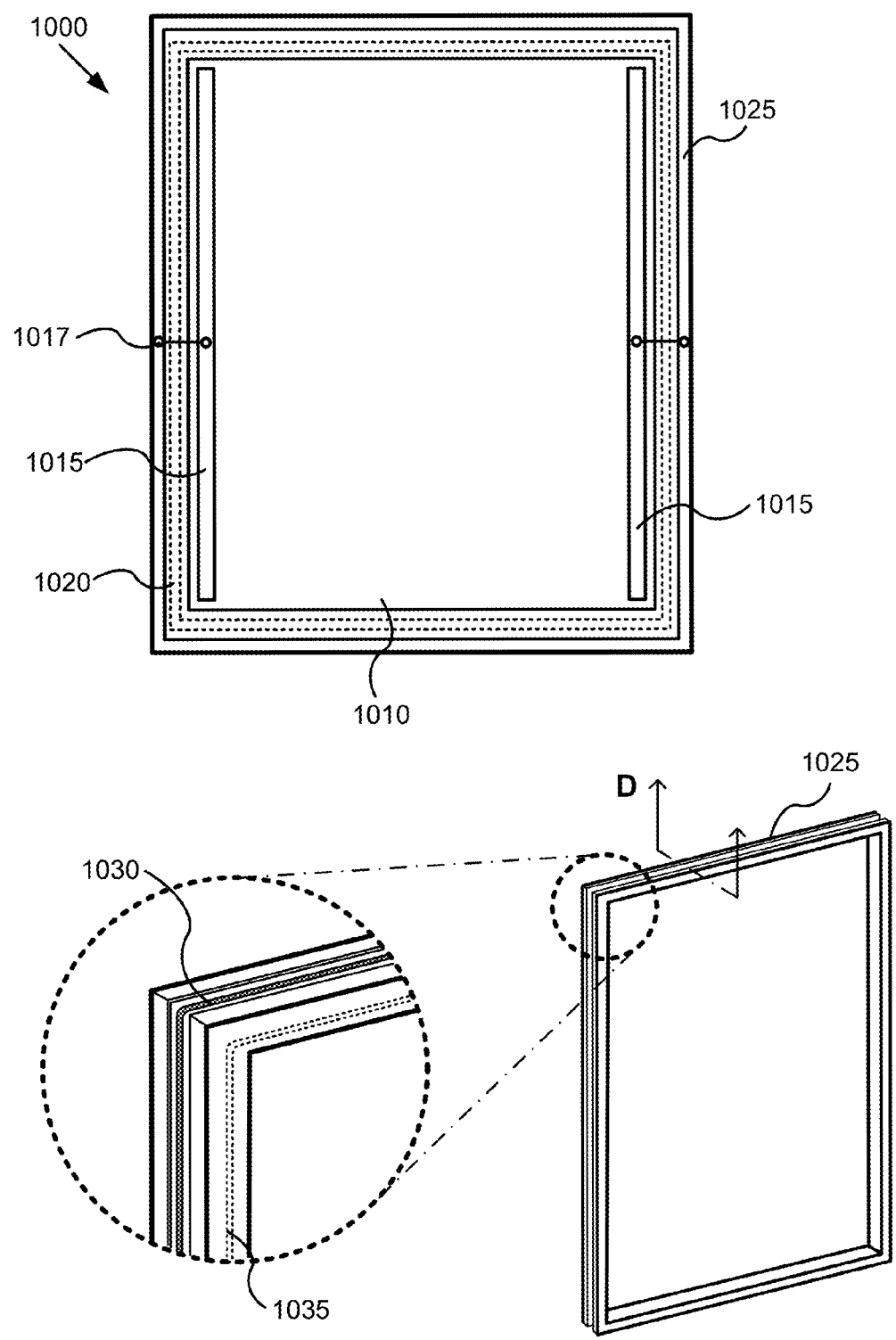

FIGS. 10A and 10B depict aspects of an insulated glass unit, 1000, including a track, 1025, and an associated connector, 1045. In this example, track 1025 is also a spacer that may serve as both a secondary sealing element and an electrical connector for an electrochromic pane of the IGU, although the sealing function is not necessary. FIG. 10A is a schematic diagram of IGU 1000 including an electrochromic pane, 1010. Electrochromic pane 1010 includes bus bars, 1015. Electrochromic pane 1010 is matched with another pane (not shown) and together the panes sandwich a separator, 1020, with a primary seal being formed between separator 1020 and the inside surfaces of the panes along with an adhesive. In this example, track 1025 is used to form a secondary seal, similar to the primary seal formed between the glass panes and separator 1020, with an adhesive between the inner surfaces of the glass panes and track 1025. Thus, in this example, the primary and secondary seals are formed in the same fashion. Track 1025 adds additional rigidity and strength to the IGU structure as well as a sealing function. In certain embodiments, the track is embedded in a traditional secondary sealant without also serving as a sealing element itself; in these embodiments, the track needs to traverse the entire perimeter of the IGU. In some embodiments, the track serves as the spacer, configured where a conventional spacer would be, along with a primary sealant between track surfaces and interior surfaces of the panes. In these embodiments, there is only one spacer, the track, which serves as a wired spacer and primary sealing element.

Track 1025 also includes rails, in this example in the form of wires, 1030 and 1035, which provide electrical communication to bus bars 1015 via wires, 1017. That is, wires 1017 connect bus bars 1015 to wires 1030 and 1035 in track 1025. Track 1025 is described further in relation to FIG. 10B. FIG. 10A, in the bottom portion, shows only track 1025. Included is an expanded view of a corner portion of track 1025, showing detail of a channel in which reside wires 1030 and 1035. In this example, wires 1030 and 1035 run all the way around the channel of track 1025. In other embodiments, wires 1030 and 1035 run only in a portion (e.g., one side, two sides, or three sides) of track 1025. The rails of the track may be other than wires, so long as they are conductive material, although wires are convenient because they are common and easily configured in a track, e.g., track 1025 may be an extruded plastic material into which wires may be molded, or the wires may be inserted into the track after extrusion or molding.

FIG. 10B shows a cross-section D, as indicated in FIG. 10A, of track 1025 showing the details of wires 1030 and 1035 and finer detail of track 1025. Track 1025 may be a non-conducting material, such as an extruded polymer, for example, that holds wires 1030 and 1035 in place. In one example, track 1025 is made of an extruded plastic channeled material. The channeled material is cut and formed, e.g., ultrasonically welded, to form a unitary body as depicted. As shown in FIG. 10B, wires 1030 and 1035 are located within recesses in track 1025 and, in this example, each wire is insulated on three sides. As mentioned, the wires may be inserted into the recesses after the track is fabricated. Track 1025 includes two slots or channels, 1040 and 1050. Slot 1050 allows for electrical connection of an electrical connector, e.g., from a window controller to IGU 1000. Wires 1017 from bus bars 1015 of the electrochromic pane 1010 may be housed in slot 1040. Wires 1017 may pass though the material of track 1025, e.g., passing from slot 1040 through an aperture and into slot 1050, so that the each of the wires 1017 may contact its respective wire 1030 or 1035. The aperture through which wires 1017 pass may be sealed prior to fabrication of the IGU, or during fabrication of the IGU, e.g., using adhesive sealant residing in slot 1040. In one example, a sealant is applied to the gap between the wire and the aperture. Slot 1040 also may allow for additional wires and/or interconnections to be made to the IGU.

In one example, track 1025 is assembled with wires 1017 being attached to rails 1030 and 1035 prior to being attached to bus bars 1015. That is, one embodiment is a track including rails and wires connected to the rails, the wires passing through the track such that the track, once sandwiched between two panes of glass, optionally with an adhesive sealant, forms a hermetic seal. In one such embodiment, assembly of the IGU includes 1) attaching wires 1017 to the bus bars, and 2) then simultaneously forming the primary and the secondary seal using separator 1020 and track 1025. Electrical connections may be made to electrochromic pane 1010 with connector 1045. Connector 1045 may include a non-conducting body 1047 with two conducting tabs, 1055 and 1060. In this example, each of the two conducting tabs 1055 and 1060 is connected to a single incoming wire, 1075. Each of the single wires may be coupled to a connector, as described herein, and ultimately connected to a window controller. In this example, to establish electrical connection, connector 1045 is inserted into slot 1050 and then twisted about 90 degrees so that each of the conducting tabs, 1055 and 1060, makes contact with a wire, 1035 and 1030, respectively. In some embodiments, to ensure that a correct wire is in contact with the correct tab, tabs 1055 and 1060 and the recesses housing wires 1030 and 1035 are asymmetrical. As shown in FIG. 10B, tab 1060 is thicker than tab 1055. Further, the recess housing wire 1030 is smaller than the recess housing wire 1035. Connector 1045 enters slot 1050 and then, by virtue of the configuration of the recesses and tabs, the connector can be turned only so that tab 1060 contacts wire 1030 and tab 1055 contacts wire 1035. Varying tab thickness and recess size is one way to help to insure that the connector 1045 is in contact with the correct wires, but other mechanisms to achieve this are also possible. In embodiments where the track is the only spacer, e.g., configured as a conventional spacer, connector 1045 may or may not be configured to penetrate the secondary sealant in order to establish contact with the rails. Where the connector 1045 is not configured to penetrate the secondary sealant to contact the rails on track 1025, portions of the track 1025 may be exposed along one or more sides of the IGU so that connector 1045 can establish contact directly, without having to penetrate the secondary sealant when inserted into the track. In the latter embodiment, secondary sealant is optionally applied to seal any open spaces remaining in the secondary seal, including those around installed connector 1045.

One of ordinary skill in the art would appreciate that other configurations of track 1025 are possible. For example, in one embodiment, track 1025 is a linear track that is inserted along one side of the IGU in the secondary sealing area. Depending upon the need, one, two, three or four such linear tracks, each along an independent side of the IGU, are installed in the IGU. In another embodiment, track 1025 is U-shaped, so that when installed in the secondary sealing area of the IGU, it allows electrical connection via at least three sides of the IGU.

Figure 11A:
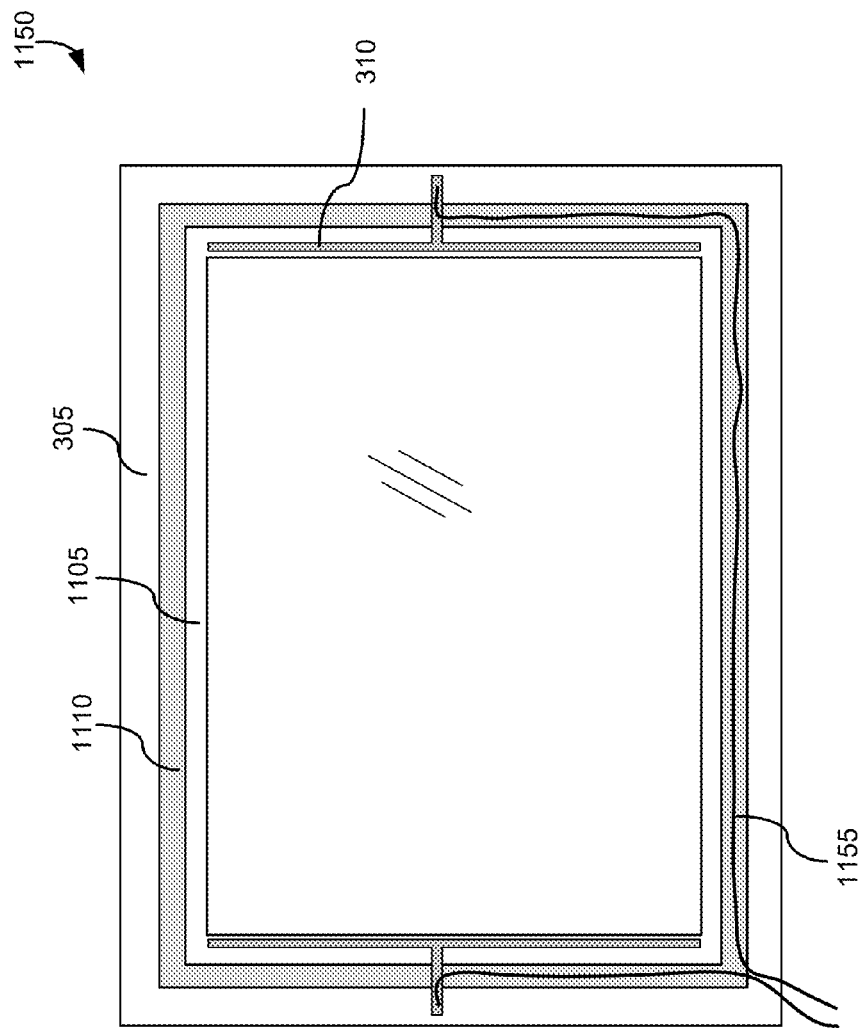
FIGS. 11A and 11B show examples of IGUs with different wiring configurations.
Figure 11B:
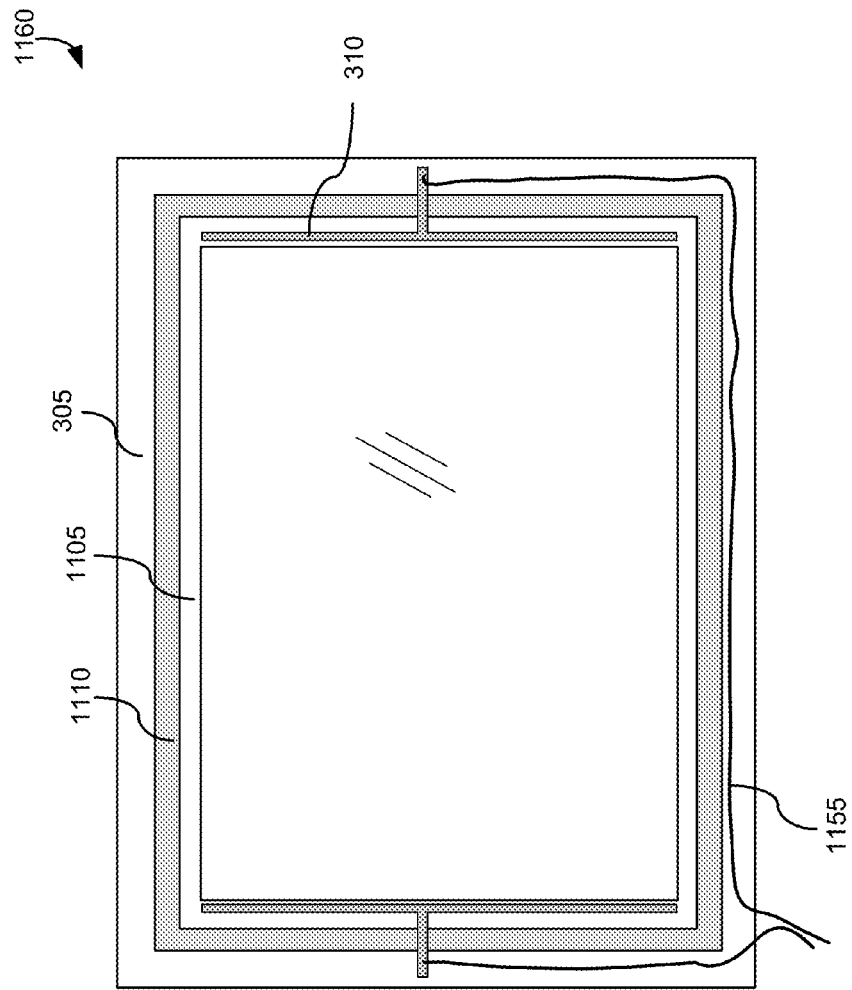

FIGS. 11A and 11B show examples of diagrams of an IGU with a two-part spacer. The IGU, 1100, shown in FIG. 11A includes electrochromic lite, 305, as depicted in FIG. 3A. Electrochromic lite 305 has bus bars, 310, fabricated on an electrochromic device (not depicted). In some embodiments, a bus bar may have a length about the length of the electrochromic device. IGU 1100 includes a two-part spacer, including an interior electrically non-conductive or insulating portion or spacer, 1105, and an exterior metal portion or spacer, 1110. In some embodiments, non-conductive or insulating spacer 1105 and metal spacer 1110 may have substantially rectangular cross sections. Non-conductive or insulating spacer 1105 may be made from a polymeric material, a plastic material, or a foam material, for example. In some embodiments, the non-conductive or insulating spacer 1105 is a Triseal spacer available from Edgetech USA (of Cambridge, Ohio). Metal spacer 1110 may be made from steel or stainless steel, for example. Metal spacer 1110 may be a conventional spacer. One or more channels may be included in the non-conductive or insulating spacer 1105 and in the metal spacer 1110, for example to house the electrical connection the bus bars 310.

The non-conductive or insulating spacer 1105 may include a notch or recess, 1115, to accommodate bus bar 310. The notch may form a channel in a side of the non-conductive or insulating spacer. An electrochromic device stack (not shown) is fabricated on glass lite 1130. Bus bar 310 located on the electrochromic device stack makes electrical contact with one of the electrodes of the device. With non-conductive or insulating spacer 1105 situated on top of bus bar 310, the risk of a short between bus bar 310 and metal spacer 1110 is reduced. An edge delete operation may still be performed on glass lite 1130 down to the glass so that metal spacer 1110 does not contact the conductive electrodes of the electrochromic device stack. The IGU primary seal is comprised of interfaces between glass lites 1130 and 1135 and primary seal material (e.g., PIB), 1140, and between primary seal material 1140 and non-conductive or insulating spacer 1105 and metal spacer 1110.

In some embodiments, metal spacer 1110 may have about the same width as a conventional spacer; i.e., about 6 millimeters wide. In some embodiments, metal spacer 1110 may have a smaller width than a conventional spacer. For example, metal spacer 1110 may be about 4 millimeters wide. Regardless of whether metal spacer 1110 has the same width or has a smaller width than a conventional spacer, the overall design of metal spacer 1110 may be similar in many regards to a conventional spacer.

A channel in one or more of the spacers may be used to house leads to the bus bars. In one embodiment, metal spacer 1110 includes a raised (i.e., less tall) portion compared to non-conductive or insulating spacer 1105. The raised portion of metal spacer 1110 effectively forms the channel or mouse hole under which the bus bar leads passes to avoid electrical contact with metal spacer 1110.

One advantage of the embodiments shown in FIGS. 11A and 11B is the incorporation of a relatively wide spacer including non-conductive or insulating spacer 1105 and metal spacer 1110. The wide spacer provides additional area for the primary seal as compared to a conventional metal spacer. As explained above, this additional seal area, which includes primary seal material, can better protect the IGU interior from moisture and other ambient gasses, as well as prevent argon or other gas in the interior of the IGU from escaping.

In some embodiments, non-conductive or insulating spacer 1105 includes a desiccant. In conventional IGUs, a desiccant is provided in the interior of the metal spacer. Therefore, the metal spacer maintains its integrity in the IGU. For example, the metal spacer cannot include any holes to the outside environment which would permit direct contact with the desiccant when a desiccant is provided in the interior of the metal spacer. Typically, there are one or more holes used to introduce desiccant into the spacer, but these are sealed after the desiccant is introduced.

The metal spacer may include holes to accommodate the wiring to connect the electrochromic device bus bars with a power source. The wires can be fed through the interior of the metal spacer. These holes may be sealed around the wires to secure the desiccant's function in the metal spacer. FIG. 11A shows an example of a diagram of an IGU in which wiring for an electrochromic device is inside the metal spacer. As shown in FIG. 11A, IGU 1150 includes electrochromic lite 305 with bus bars 310 fabricated on an electrochromic device (not depicted). IGU 1150 includes a two-part spacer, including an interior non-conductive or insulating spacer 1105 and an exterior metal spacer 1110. Wires 1155 are in electrical contact with leads from bus bars 310. The wires are shown as being in the interior of metal spacer 1110 and exit from metal spacer 1110, providing electrical communication from the interior of IGU 1150 to the exterior of IGU 1150. FIG. 11B shows an alternative embodiment, 1160, where the wires run in the secondary seal area, external to both spacers.

In some embodiments, the non-conductive or insulating spacer and the metal spacer may form a barrier between an exterior region and an inter region of the IGU. The metal spacer may include two holes, with a wire in electrical contact or communication with an electrode of an electrochromic device passing through the first hole, though the hollow metal spacer, and out of the second hole. The wire may provide electrical communication from the exterior region of the IGU to the interior region of the IGU.

The manufacturing advantage of the embodiment shown in FIG. 11A is that a spacer can be fabricated from the metal rectangular tubular portion in which the wires have already been fed. These metal rectangular tubular portions are normally provided as linear sections which are subsequently bent into the rectangular shape of the spacer. If the wiring is provided in the linear sections prior to bending, the difficulty of feeding a metal wire through bent portions of the metal rectangular tubes is avoided. During manufacturing, and after the wiring is connected to the bus bar through the metal portion of the spacer, the holes in the metal tubular portion through which the wires are fed can be plugged with a sealant, such as PIB, for example.

In some other embodiments, the entire spacer may be made from a material that is electrically non-conductive (i.e., electrically resistive or electrically insulating) and therefore does not exhibit any of the three modes of shorting illustrated in FIG. 4. Examples of such materials that may be used for a spacer include plastic materials, polymeric material, foam materials, and hard rubber materials. As an example, a foam spacer similar to a Triseal spacer (Cambridge, Ohio), as mentioned above, may be used. When an electrically resistive spacer is used, it may be wider such that it occupies about 5 millimeters to about 10 millimeters of the outer edge of the IGU. This embodiment does not include a metal spacer, and the non-conductive material may be sufficiently rigid and strong to serve the role of a spacer. In some embodiments, the non-conductive spacer includes a desiccant and/or wiring, as described and illustrated in the context of FIGS. 11A and 11B.

In some embodiments, a metal spacer has an electrically non-conductive or insulating outer coating (i.e., an electrically resistive outer coating) but may otherwise be similar in design and structure to a conventional spacer. In some embodiments, the metal spacer may have a substantially rectangular cross section. In some embodiments, the non-conductive outer coating may be on at least one side of the substantially rectangular cross section of the metal spacer. In some embodiments, the non-conductive outer coating may be on all four sides of the substantially rectangular cross section of the metal spacer. In some embodiments, the metal spacer may include a channel configured to accommodate an electrode of an optically switchable device on one of the glass lites.

For example, one embodiment is metal spacer coated on one or more sides with an insulating (non-electrically conductive) coating. The insulating coating may be a paint or polymeric material such as polytetrafluoroethylene or similar material. The spacer is used along with a primary sealant material as described herein. The spacer may include a channel and/or a notch as described herein. In one embodiment, the spacer includes one or more connector keys as described herein. In one embodiment, the spacer is coated on all sides; in another embodiment, the spacer is coated on only the sides proximate the bus bar and/or bus bar lead.

Although the foregoing embodiments have been described in some detail to facilitate understanding, the described embodiments are to be considered illustrative and not limiting. It will be apparent to one of ordinary skill in the art that certain changes and modifications can be practiced within the scope of the appended claims.

What is claimed is:

1. A magnetic assembly for providing electrical power to an electrochromic window, the magnetic assembly comprising:
   a first connector comprising a first pair of electrical contacts, each of the electrical contacts of the first pair of electrical contacts wired to a distinct bus bar of a pair of bus bars configured to deliver power to an electrochromic device of the electrochromic window;
   a second connector that is shaped to register and engage with the first connector, the second connector comprising a second pair of electrical contacts configured to deliver electrical power from a power source; each electrical contact of the first pair of electrical contacts configured to engage with a distinct electrical contact of the second pair of electrical contacts and establish electrical communication when the first and second connectors are engaged with each other; and
   at least one magnetic element configured to magnetically hold the first and second connectors together when they are registered with each other.

2. The magnetic assembly of claim 1, comprising a pair of magnetic elements.

3. The magnetic assembly of claim 2, wherein each magnetic element of the pair of magnetic elements is configured to register with the other and so as to attract each other with opposite magnetic poles when the first and second connectors are engaged.

4. The magnetic assembly of claim 2, wherein the pair of ferromagnetic elements comprises neodymium.

5. The magnetic assembly of claim 1, wherein at least one electrical contact, of the four individual electrical contacts that make up the first and second pair of electrical contacts, is magnetic.

6. The magnetic assembly of claim 5, wherein at least two electrical contacts, of the four individual electrical contacts that make up the first and second pair of electrical contacts, are magnetic.

7. The magnetic assembly of claim 5, wherein at least one electrical contact, of the four individual electrical contacts that make up the first and second pair of electrical contacts, comprises neodymium.

8. The magnetic assembly of claim 1, comprising a first and a second pair of magnetic elements configured to register with the other and so as to attract each other with opposite magnetic poles when the first and second connectors are engaged.

9. The magnetic assembly of claim 1, wherein the first and/or second pair of electrical contacts are pads.

10. The magnetic assembly of claim 1, wherein the first or second pair of electrical contacts are spring-type pins.

11. The magnetic assembly of claim 10, wherein the spring-type pins are magnetic.

12. The magnetic assembly of claim 1, wherein a distal end of the second connector comprises a floating connector.

13. The magnetic assembly of claim 1, wherein a distal end of the second connector comprises terminals for connecting to a window controller.

14. The magnetic assembly of claim 1, wherein the first connector comprises a memory device and/or an integrated circuit device, the memory device and/or integrated circuit device storing information for identifying the electrochromic window and/or for controlling optical transitions of the electrochromic device.

15. The magnetic assembly of claim 14, wherein the memory device and/or integrated circuit device stores information specifying a maximum electric signal that may be applied to the electrochromic device.

16. The magnetic assembly of claim 15, wherein the memory device and/or integrated circuit device stores information specifying a maximum voltage and/or current that may be applied to the electrochromic device.

17. The magnetic assembly of claim 1, wherein the second connector comprises a memory device and/or an integrated circuit device, the memory device and/or integrated circuit device storing information for identifying the electrochromic window and/or for controlling optical transitions of the electrochromic device.

18. The magnetic assembly of claim 17, wherein the memory device and/or integrated circuit device storing information for identifying the electrochromic window and/or for controlling optical transitions of the electrochromic device is provided in a floating connector provided at a distal end of the second connector.

19. The magnetic assembly of claim 1, wherein each of the first and second connectors comprises at least five electrical contacts, at least two of which are configured to transfer power, and at least three of which are configured to transfer communication information.

20. The magnetic assembly of claim 1, wherein the at least one magnetic element comprises neodymium.

21. The magnetic assembly of claim 1, wherein at least two electrical contacts, of the four individual electrical contacts that make up the first and second pair of electrical contacts, comprise neodymium.

22. The magnetic assembly of claim 1, wherein the first connector is positioned within a secondary seal of the electrochromic window, wherein the secondary seal is provided around an outer perimeter of a primary sealing spacer positioned between a first lite and a second lite of the electrochromic window.

23. The magnetic assembly of claim 22, wherein each of the first pair of electrical contacts is wired to the distinct bus bar of the pair of bus bars through wires that are enclosed in the secondary seal or the primary sealing spacer.

24. The magnetic assembly of claim 1, wherein the first connector is part of the electrochromic window, and wherein the second connector is separable from the electrochromic window.

* * * * *